US009403716B2

(12) United States Patent  
Dejneka et al.

(10) Patent No.: US 9,403,716 B2  
(45) Date of Patent: Aug. 2, 2016

(54) GLASS-CERAMIC(S); ASSOCIATED FORMABLE AND/OR COLOR-TUNABLE, CRYSTALLIZABLE GLASS(ES); AND ASSOCIATED PROCESS(ES)

(71) Applicant: Corning Incorporated, Corning, NY (US)

(72) Inventors: Matthew John Dejneka, Corning, NY (US); Charlene Marie Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 86 days.

(21) Appl. No.: 14/038,203

(22) Filed: Sep. 26, 2013

(65) Prior Publication Data

US 2014/0087194 A1 Mar. 27, 2014

Related U.S. Application Data

(60) Provisional application No. 61/706,733, filed on Sep. 27, 2012.

(51) Int. Cl.
```
C03C 10/00    (2006.01)
C03C 14/00    (2006.01)
C03C 4/00     (2006.01)
```
(2006.01)

(Continued)

(52) U.S. Cl.
CPC ............... *C03C 14/006* (2013.01); *C03C 3/091* (2013.01); *C03C 3/093* (2013.01); *C03C 3/097* (2013.01);

(Continued)

(58) Field of Classification Search
CPC   C03C 10/00; C03C 10/0009; C03C 10/0018; C03C 10/0027; C03C 10/0036; C03C 10/0045
USPC ............................................ 501/2, 4, 5, 6, 7
See application file for complete search history.

(56) References Cited

U.S. PATENT DOCUMENTS

| 5,070,045 A | 12/1991 | Comte et al. ................... 501/4 |
| 6,528,440 B1 * | 3/2003 | Vilato et al. ................... 501/7 |

(Continued)

FOREIGN PATENT DOCUMENTS

| CN | 102690059 | 9/2012 |
| EP | 0437228 B2 | 3/2002 |
| WO | 2012/124774 | 9/2012 |

OTHER PUBLICATIONS

European Patent Office; International Search Report; Jul. 2, 2014; pp. 1-3.

*Primary Examiner* — Noah Wiese  
(74) *Attorney, Agent, or Firm* — Timothy M. Schaeberle

(57) ABSTRACT

Disclosed herein are one or more of formable and/or color-tunable, crystallizable glasses; formed and/or color-tuned glass-ceramics; IXable, formed and/or color-tuned glass-ceramics; IX, formed and/or color-tuned glass-ceramics; a machine or equipment including a formed and/or color-tuned glass-ceramic; a machine or equipment including an IXable, formed and/or color-tuned glass-ceramics; a machine or equipment including an IX, formed and/or color-tuned glass-ceramics; one or more processes for making formable, crystallizable glasses crystallizable; one or more processes for making formable and/or color-tunable, crystallizable glasses; one or more processes for making formed and/or color-tuned glass-ceramics; one or more processes for making IXable, formed and/or color-tuned glass-ceramics; one or more processes for making IX, formed and/or color-tuned glass-ceramics; and one or more processes for using any one of formable and/or color-tunable, crystallizable glasses; formed and/or color-tuned glass-ceramics; IXable, formed and/or color-tuned glass-ceramics; and/or IX, formed and/or color-tuned glass-ceramics.

11 Claims, 14 Drawing Sheets

(51) Int. Cl.
*C03C 3/091* (2006.01)
*C03C 3/093* (2006.01)
*C03C 3/097* (2006.01)

(52) U.S. Cl.
CPC ........... *C03C 4/0028* (2013.01); *C03C 10/0045* (2013.01); *C03C 10/0054* (2013.01); *C03C 21/002* (2013.01); *Y10T 428/315* (2015.01)

(56) References Cited

U.S. PATENT DOCUMENTS

| | | | |
|---|---|---|---|
| 8,257,831 B2* | 9/2012 | Yagi | 428/426 |
| 2011/0092353 A1 | 4/2011 | Amin et al. | 501/3 |
| 2012/0135848 A1* | 5/2012 | Beall et al. | 501/32 |
| 2014/0099501 A1 | 4/2014 | Yamamoto et al. | |

* cited by examiner

GLASS-CERAMIC(S); ASSOCIATED FORMABLE AND/OR COLOR-TUNABLE, CRYSTALLIZABLE GLASS(ES); AND ASSOCIATED PROCESS(ES)

This application claims the benefit of priority under 35 U.S.C. §119 of U.S. Provisional Application Ser. No. 61/706,733 filed on Sep. 27, 2012 the content of which is relied upon and incorporated herein by reference in its entirety.

TECHNICAL FIELD

Aspects of embodiments and/or embodiments of (hereinafter aspects and/or embodiments of) this disclosure generally relate to the field of glass and glass-ceramic materials and glass glass-ceramic technologies. Also, aspects and/or embodiments are directed to one or more of formable and/or color-tunable, crystallizable glasses; formed and/or color-tuned glass-ceramics; ion exchangeable (IXable), formed and/or color-tuned glass-ceramics; ion exchanged (IX), formed and/or color-tuned glass-ceramics; a machine or equipment including a formed and/or color-tuned glass-ceramic; a machine or equipment including an IXable, formed and/or color-tuned glass-ceramics; a machine or equipment including an IX, formed and/or color-tuned glass-ceramics; one or more processes for making formable, crystallizable glasses crystallizable; one or more processes for making formable and/or color-tunable, crystallizable glasses; one or more processes for making formed and/or color-tuned glass-ceramics; one or more processes for making IXable, formed and/or color-tuned glass-ceramics; one or more processes for making IX, formed and/or color-tuned glass-ceramics; and one or more processes for using any one of formable and/or color-tunable, crystallizable glasses; formed and/or color-tuned glass-ceramics; IXable, formed and/or color-tuned glass-ceramics; and IX, formed and/or color-tuned glass-ceramics.

BACKGROUND

In the past decade, as electronic devices such as notebook computers, personal digital assistants (PDAs), portable navigation device (PNDs), media players, mobile phones, portable inventory devices (PIDs) . . . etc. (frequently referred to as "portable computing devices") have converged while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with the portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, plastics are soft materials that are easily scratched and scuffed degrading their appearance.

Among known classes of materials are glass-ceramics that are used widely in various other applications and are much harder and more scratch resistant than polymers. For example, glass-ceramics are used widely in kitchens as cooktops, cookware, and eating utensils, such as bowls, dinner plates, and the like. Transparent glass-ceramics are used in the production of oven and/or furnace windows, optical elements, mirror substrates, and the like. Glass-ceramics are typically made by thermally treating crystallizable glass compositions at prespecified temperatures for prespecified periods of time to nucleate and grow crystalline phases in a glass matrix. Two glass-ceramics based on the $SiO_2$—$Al_2O_3$—$Li_2O$ glass system comprise those having either β-quartz solid solution (β-quartz ss) as the predominant crystalline phase or β-spodumene solid solution (β-spodumene ss) as the predominant crystalline phase.

There exists a need for glass and glass-ceramic materials as well as glass and glass-ceramic technologies that provide improved choices for enclosures or housings of portable computing devices. Such materials include formable and/or color-tunable, crystallizable glasses; formed and/or color-tuned glass-ceramics; IXable, formed and/or color-tuned glass-ceramics; and IX, formed and/or color-tuned glass-ceramics. Also, there exists a need for such materials that are formulated to provide such improved forms and/or colors while addressing the design challenge of creating light, strong, scratch resistant, and rigid enclosures or housings. Moreover, there exists a need for one or more process(es) for making formable and/or color-tunable, crystallizable glasses; formed and/or color-tuned glass-ceramics; IXable, formed and/or color-tuned glass-ceramics; and IX, formed and/or color-tuned glass-ceramics.

SUMMARY

Aspects of embodiments and/or embodiments of (hereinafter aspects and/or embodiments of) this disclosure generally relate to the field of glass and glass-ceramic materials as well as glass and glass-ceramic technologies. Such glass and glass-ceramic materials include:

a glass formulated to be formable and/or color-tunable and formulated to be crystallizable to formed and/or color-tuned glass-ceramics (hereinafter "formable and crystallizable glass" or "formable and crystallizable glasses" or "formable, crystallizable glass" or "formable, crystallizable glasses" "color-tunable and crystallizable glass" or "color-tunable and crystallizable glasses" or "color-tunable, crystallizable glass" or "color-tunable, crystallizable glasses" or "formable and/or color-tunable and crystallizable glass" or "formable and/or color-tunable and crystallizable glasses" or "formable and/or color-tunable, crystallizable glass" or "formable and/or color-tunable, crystallizable glasses" or "crystallizable glass" or "crystallizable glasses"); or a glass-ceramic (hereinafter "formed glass-ceramic" or "formed glass-ceramics" or "color-tuned glass-ceramic" or "color-tuned glass-ceramics" or "formed and/or color-tuned glass-ceramic" or "formed and/or color-tuned glass-ceramics" or "formed, color-tuned glass-ceramic" or "formed, color-tuned glass-ceramics" or "color-tuned, formed glass-ceramic" or "color-tuned, formed glass-ceramics" or "glass-ceramic" or "glass-ceramics"); or an IXable, glass-ceramic subjectable to an ion exchange (IX) surface treatment (hereinafter "ion exchangeable (IXable) glass-ceramic" or "IXable, glass-ceramics" or "IXable, formed glass-ceramic" or "IXable, formed glass-ceramics" or "IXable, color-tuned glass-ceramic" or "IXable, color-tuned glass-ceramics" or "IXable, formed and/or color-tuned glass-ceramic" or "IXable, formed and/or color-tuned glass-ceramics" or "IXable, formed, color-tuned glass-ceramic" or "IXable, formed, color-tuned glass-ceramics" or "IXable, color-tuned, formed glass-ceramic" or "IXable, color-tuned, formed glass-ceramics" or "glass-ceramic" or "glass-ceramics"); or an ion exchanged (IX) glass-ceramic (hereinafter "ion exchanged (IX) glass-ceramic" or "ion exchanged (IX) glass-ceramics" or "ion exchanged (IX) glass-ceramic" or "IX, glass-ceramics" or "IX, formed glass-ceramic" or "IX, formed glass-ceramics" or "IX, color-tuned glass-ceramic" or "IX, color-tuned glass-ceramics" or "IX, formed and/or color-tuned glass-ceramic" or "IX, formed and/or color-tuned glass-ceramics" or "IX, formed, color-tuned glass-ceramic" or "IX, formed, color-tuned glass-ceramics" or "IX, color-tuned, formed glass-ceramic" or "IX, color-tuned, formed glass-ceramics" or "glass-ceramic" or "glass-ceramics").

In some aspects and/or embodiments, such crystallizable glasses are formulated to produce, upon thermal treatment, glass-ceramics including while such glass-ceramics include:
  a. less than about 20 percent by weight (wt %) of one or more crystalline phases including one or more oxides; and
  b. a composition calculated on an oxide basis in percent by mole (mol %) including:
    i. $SiO_2$: about 50-76;
    ii. $Al_2O_3$: about 4-25;
    iii. $P_2O_5+B_2O_3$: about 0-14;
    iv. $R_2O$: about 0-33;
    v. one or more nucleating agents: about 0-5; and
    vi. optionally, RO: about 0-20.

In some other aspects and/or embodiments relating to one or more processes, mixtures of raw materials are formulated to produce, upon melting, crystallizable glasses formulated to be crystallizable to glass-ceramics including while crystallizable glasses are formulated to produce, upon thermal treatment, glass-ceramics including:
  a. less than about 20 wt % of one or more crystalline phases including one or more oxides; and
  b. a composition calculated on an oxide basis in mol % including:
    i. $SiO_2$: about 50-76;
    ii. $Al_2O_3$: about 4-25;
    iii. $P_2O_5+B_2O_3$: about 0-14;
    iv. $R_2O$: about 0-33;
    v. one or more nucleating agents: about 0-5; and
    vi. optionally, RO: about 0-20.

Still other aspects and/or embodiments of this disclosure relate to formed and/or color-tuned glass-ceramics; IXable, formed and/or color-tuned glass-ceramics; and IX, formed and/or color-tuned glass-ceramics having a color presented in CIELAB color space coordinates for CIE illuminant D65 determined from reflectance spectra measurements using a spectrophotometer with specular reflectance excluded (SCE) with an a* coordinate from about −2 to about +8 and a b* coordinate from about −7 to about +30. In some aspects, a L* coordinate can approach dark colors and/or black (e.g., from about 0 to about 70, or alternately, from about 0 to about 45, or then again, from about 0 to about 10) while in other aspect the L* coordinate can approach light colors and/or white (e.g., from about 85 to about 100).

Some other aspects and/or embodiments of this disclosure relate to IXable, formed and/or color-tuned glass-ceramics and/or IX, formed and/or color-tuned glass-ceramics of the previous paragraphs. In aspects, IXable, formed and/or color-tuned glass-ceramics are formulated to be capable of being subjected to an ion exchange treatment so as to have while the IX, formed and/or color-tuned glass-ceramics have at least one surface under a compressive stress (σs) of at least about 200 megapascals (MPa).

Yet other aspects and/or embodiments of this disclosure relate to formable and/or color-tunable, crystallizable glasses. Compositions of such crystallizable glasses are formulated, for example, to be capable of being formed from a molten state using one or more of a float method, a slot draw method, and/or a fusion method and, optionally, subsequently a redraw method and/or roll out method. To that end in aspects, such compositions are formulated so that of such crystallizable glasses have a liquidus viscosity ($\eta_{lqds}$) of at least about 20 kilopoise (kP), or alternatively, at least about 50 kP, then again, at least about 100 kP, or, alternatively then again, more than about 150 kP; a liquidus temperature ($T_{lqds}$) less than about 1600° C., alternatively, less than about 1400° C., or then again, less than about 1300° C., or alternatively then again, less than about 1200° C., or, alternatively still then again, less than about 1100° C.; and a resistance to devitrification (herein after "resistant to devitrification" or "devitrification resistant") while cooling from a liquid state.

In various aspects relating to formable and/or color-tunable, crystallizable glasses of the previous paragraphs, compositions are formulated, for example, to ease processing (e.g., melting, processing, forming . . . etc.) such crystallizable glasses. As one example, a glass composition can be formulated to have a percent transmission (% transmission) of at least one wavelength, $\lambda_T$, in an interval of wavelengths from about 390 nm-2500 nm through an about 0.8 mm thickness of at least about 90, alternatively, at least about 70, then again, at least about 50. As another example, a glass composition can be formulated to have an average value in percent (%) of Transmission over a $\lambda$ interval from about 390 nm-2500 nm $$\left[ {}^{2500\,nm}_{390\,nm}T_{avg}(\%) = \frac{1}{(2500-390\,nm)} \sum_{390\,nm}^{2500\,nm} T_\lambda\{\%\} \right]$$

through an about 0.8 mm thickness of at least about 40, alternatively, at least about 50, then again, at least about 70.

In still other various aspects relating to formable and/or color-tunable, crystallizable glasses, such compositions can be formulated, for example, so that such crystallizable glasses are capable of being transformed to formed and/or color-tuned glass-ceramics and/or ion exchangeable and formed and/or color-tuned glass-ceramics described in the previous paragraphs. In these still other various aspects, crystallization can occur by heat treating such crystallizable glasses at one or more preselected temperatures for one or more preselected times to nucleate and grow one or more crystalline phases having one or more compositions, amounts, morphologies, sizes or size distributions . . . etc.

In yet other various aspects relating to formable and/or color-tunable, crystallizable glasses, such compositions can be formulated, for example, so that such formed and/or color-tuned glass-ceramics described in the previous paragraphs are capable of being transformed to IX, formed and/or color-tuned glass-ceramics described in the previous paragraphs using one or more preselected ion exchange techniques. In these yet other various aspects, ion exchange can occur by subjecting one or more surfaces of such formed and/or color-tuned glass-ceramics to one or more ion exchange (IX) bath having one or more preselected composition at one or more preselected temperatures for one or more preselected times to impart to one or more surfaces with one or more compressive stress (σs) and/or one or more average surface compressions (CSavg), and/or one or more depths of layer (DOL).

Still yet other aspects and/or embodiments of this disclosure relate to dielectric properties of formed and/or color-tuned glass-ceramics; IXable, formed and/or color-tuned glass-ceramics; and IX, formed and/or color-tuned glass-ceramics of the previous paragraphs. That is, in addition to such glass-ceramics having one or more preselected colors, which additionally might be tunable or have been tuned, for example, to impart one or more aesthetic colors, such glass-ceramics can possess advantageous dielectric properties, such as, a loss tangent over a frequency ranging from about 0.5-3.0 gigahertz (GHz) at about 25° C. and/or a dielectric constant over a frequency ranging from about 0.5-3.0 GHz at about 25° C.

To that end, formed and/or color-tuned glass-ceramics and/or IX, formed and/or color-tuned glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, formed and/or color-tuned glass-ceramics and/or IX, formed and/or color-tuned glass-ceramics might be used in automotive, appliances, and even architectural applications.

Numerous other aspects of embodiments, embodiments, features, and advantages of this disclosure will appear from the following description and the accompanying drawings. In the description and/or the accompanying drawings, reference is made to exemplary aspects and/or embodiments of this disclosure which can be applied individually or combined in any way with each other. Such aspects of embodiments and/or embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any subranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

BRIEF DESCRIPTION OF THE FIGURES

The drawings referenced herein form a part of the specification. Features shown in the drawings are meant to be illustrative of some, but not all, embodiments of this disclosure, unless otherwise explicitly indicated, and implications to the contrary are otherwise not to be made. Although like reference numerals correspond to similar, though not necessarily identical, components and/or features in the drawings, for the sake of brevity, reference numerals or features having a previously described function may not necessarily be described in connection with other drawings in which such components and/or features appear.

DETAILED DESCRIPTION

Figure 1:
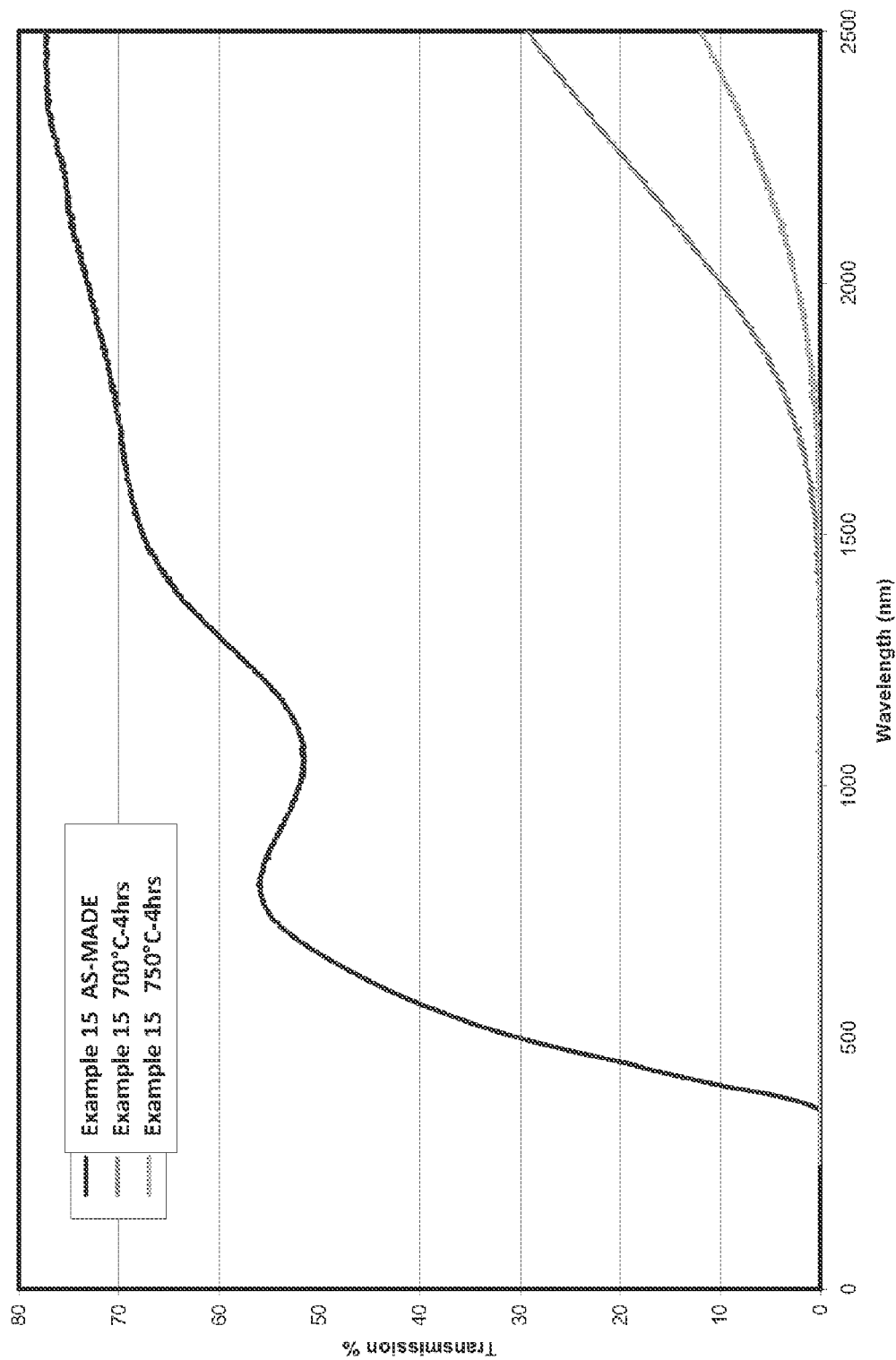
FIG. 1. shows comparisons of the transmission spectra for visible and IR wavelengths obtained for as-made and heat treated glasses of Example 15 made according to aspects and/or embodiments of this disclosure and demonstrating that an as-made glass transmits sufficiently to enable efficient melting.
Figure 2:
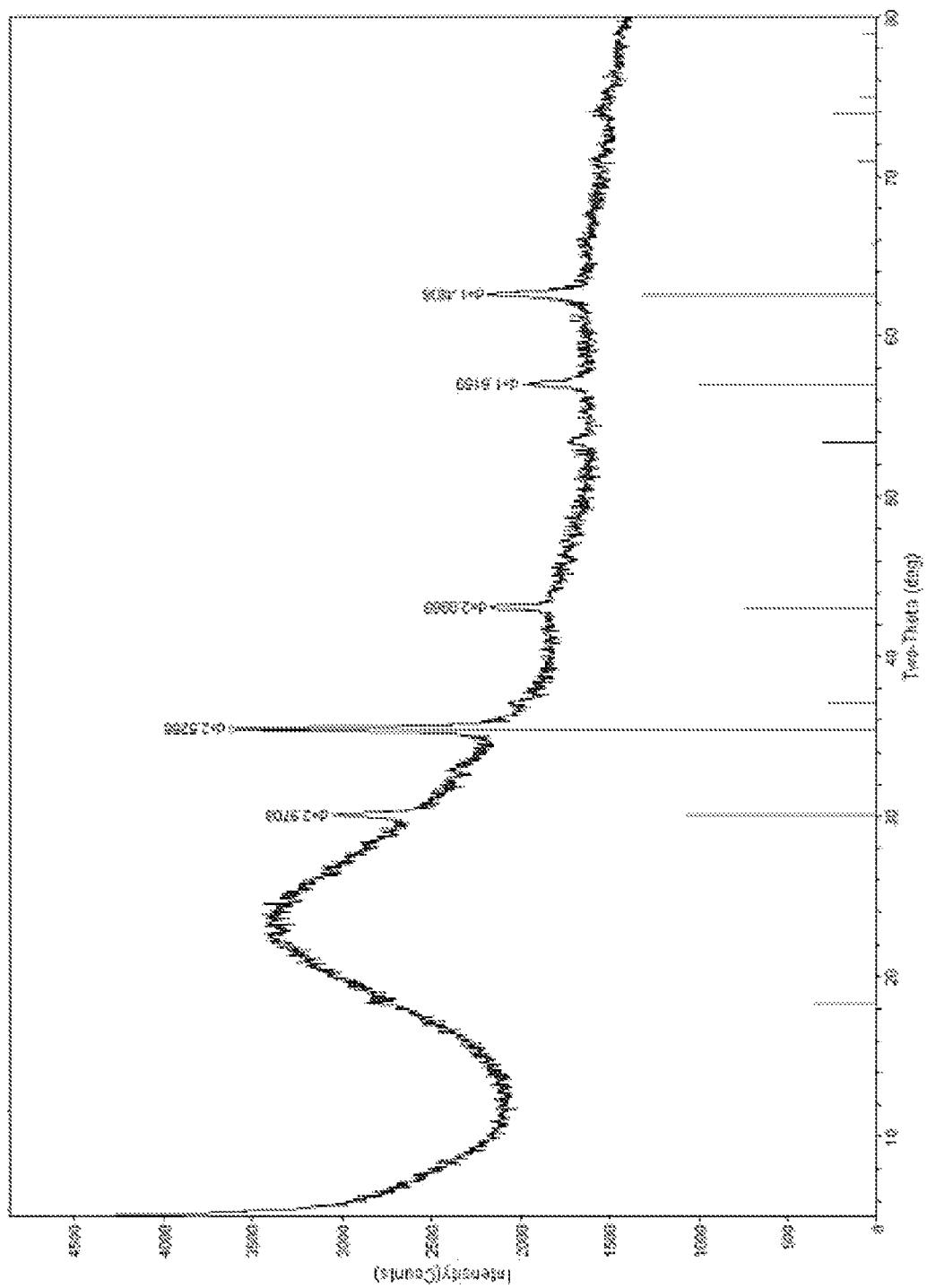
FIG. 2. shows the X-ray diffraction (XRD) pattern obtained for the glass of Example 3 after heat treating at 700° C. for 4 hours (hr) and showing the presence of Magnetite ($Fe_3O_4$) and made according to aspects and/or embodiments of this disclosure.
Figure 3:
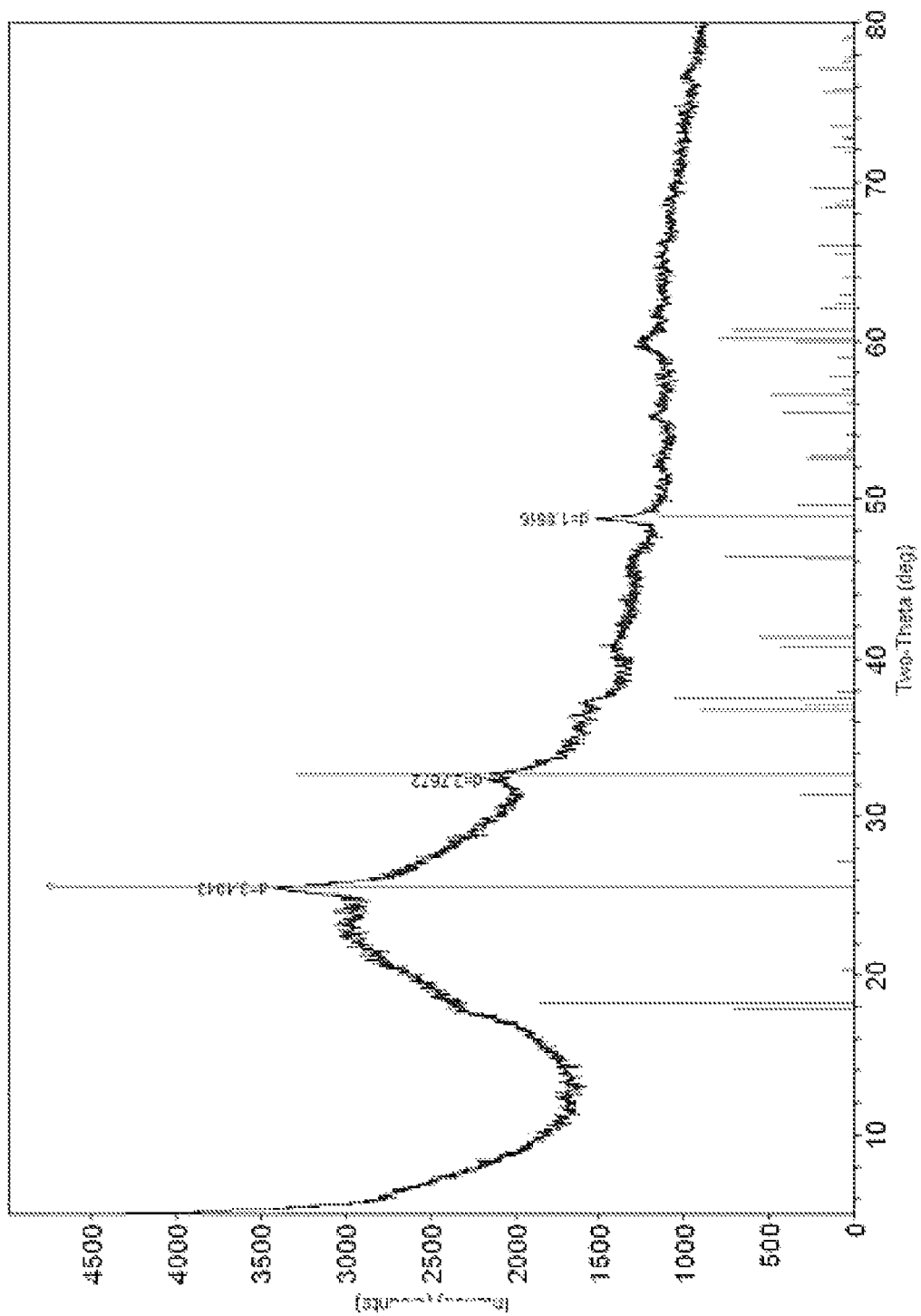
FIG. 3. shows the XRD pattern obtained for the glass of Example 16 heat treated at 750° C. for 4 hr showing the presence of pseudobrookite for which line broadening analysis suggests crystallite sizes of roughly between 15-20 nm and made according to aspects and/or embodiments of this disclosure.
Figure 4:
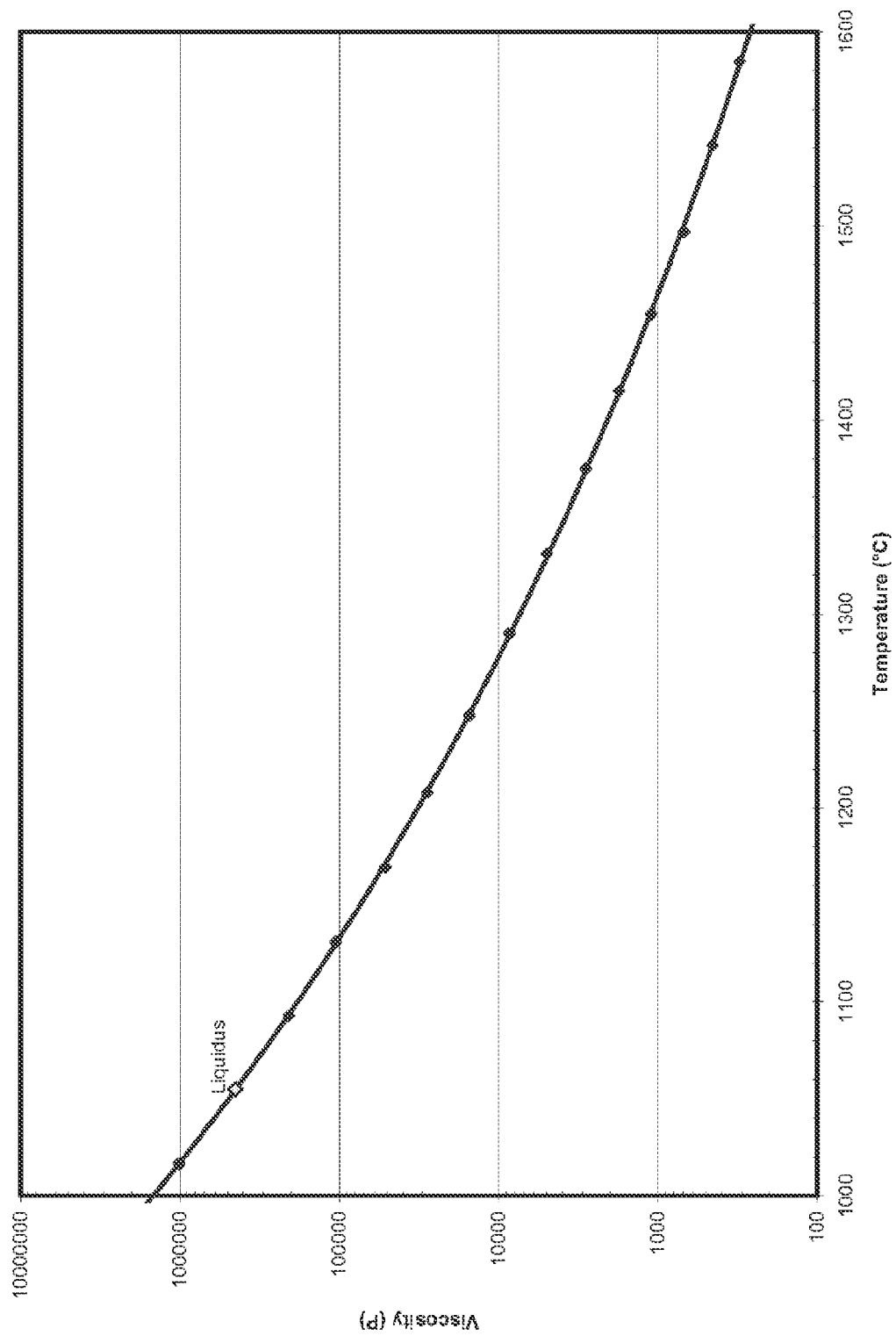
FIG. 4, shows the viscosity versus temperature curve denoting the liquidus temperature and viscosity for the glass of Example 15 made according to still other aspects and/or embodiments of this disclosure.
Figure 5:
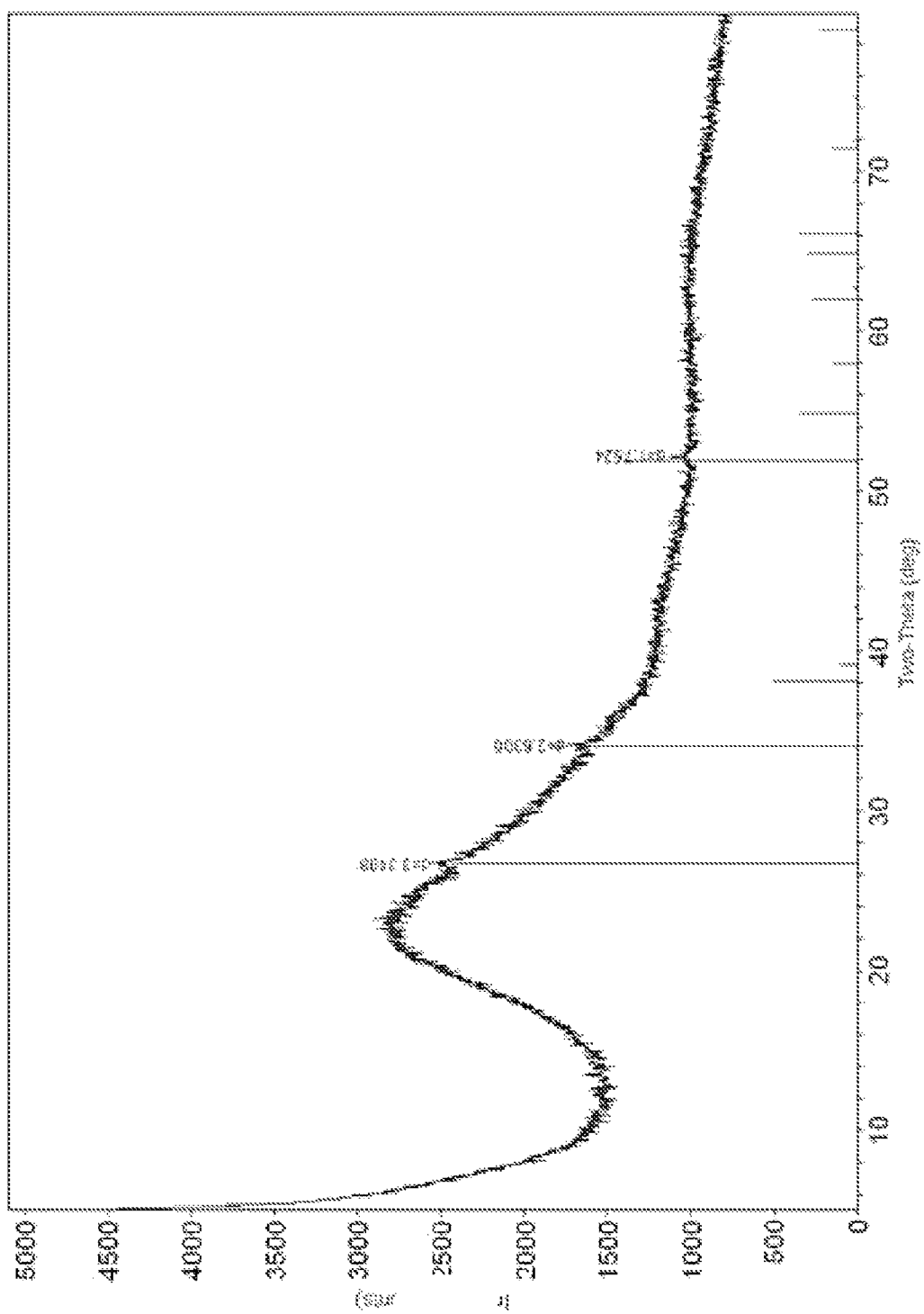
FIG. 5. shows the XRD pattern obtained for the glass of Example 16 heat treated at Example 73 heat treated at 700° C. for 2 hr and 850° C. for 4 hr showing the presence of cassiterite crystals and made according to aspects and/or embodiments of this disclosure.
Figure 6:
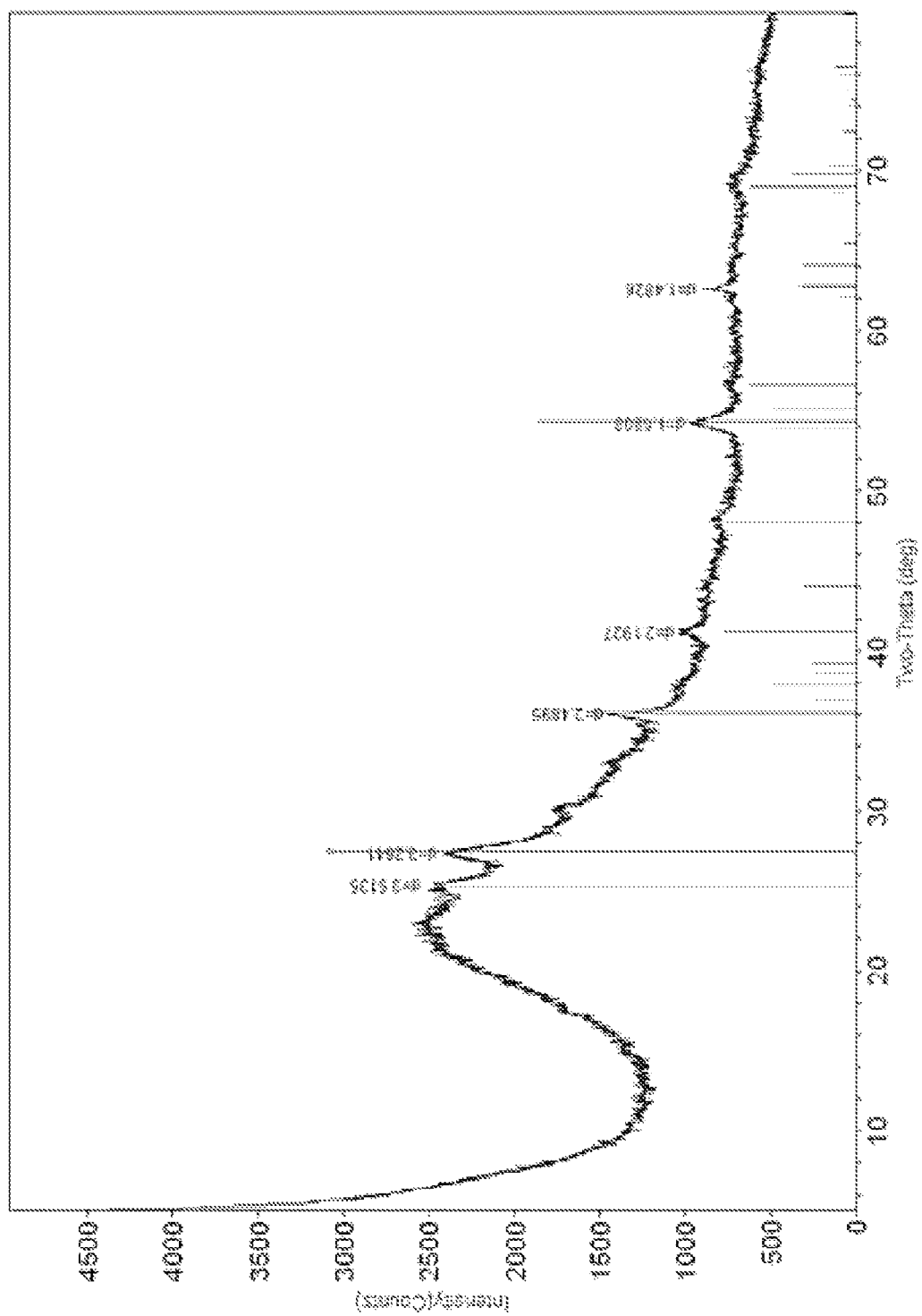
FIG. 6. shows the XRD pattern obtained for the glass of Example 77 heat treated at 700° C. for 2 hr and 850° C. for 4 hr showing the presence of rutile and anatase crystals and made according to aspects and/or embodiments of this disclosure.
Figure 7:
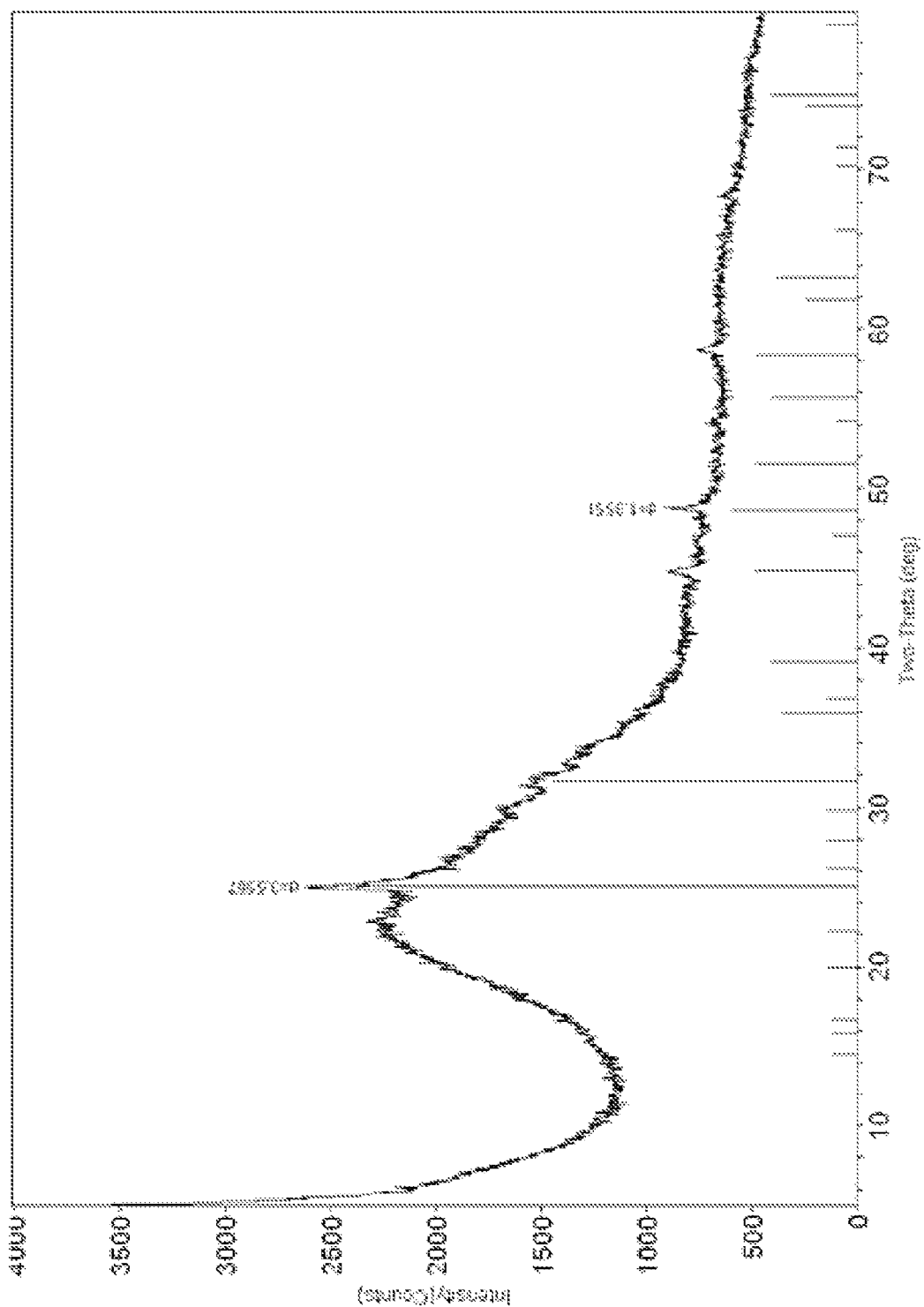
FIG. 7. shows the XRD pattern obtained for the glass of Example 89 heat treated at 700° C. for 2 hr and 850° C. for 4 hr showing the presence of calcium phosphate crystals and made according to aspects and/or embodiments of this disclosure.
Figure 8:
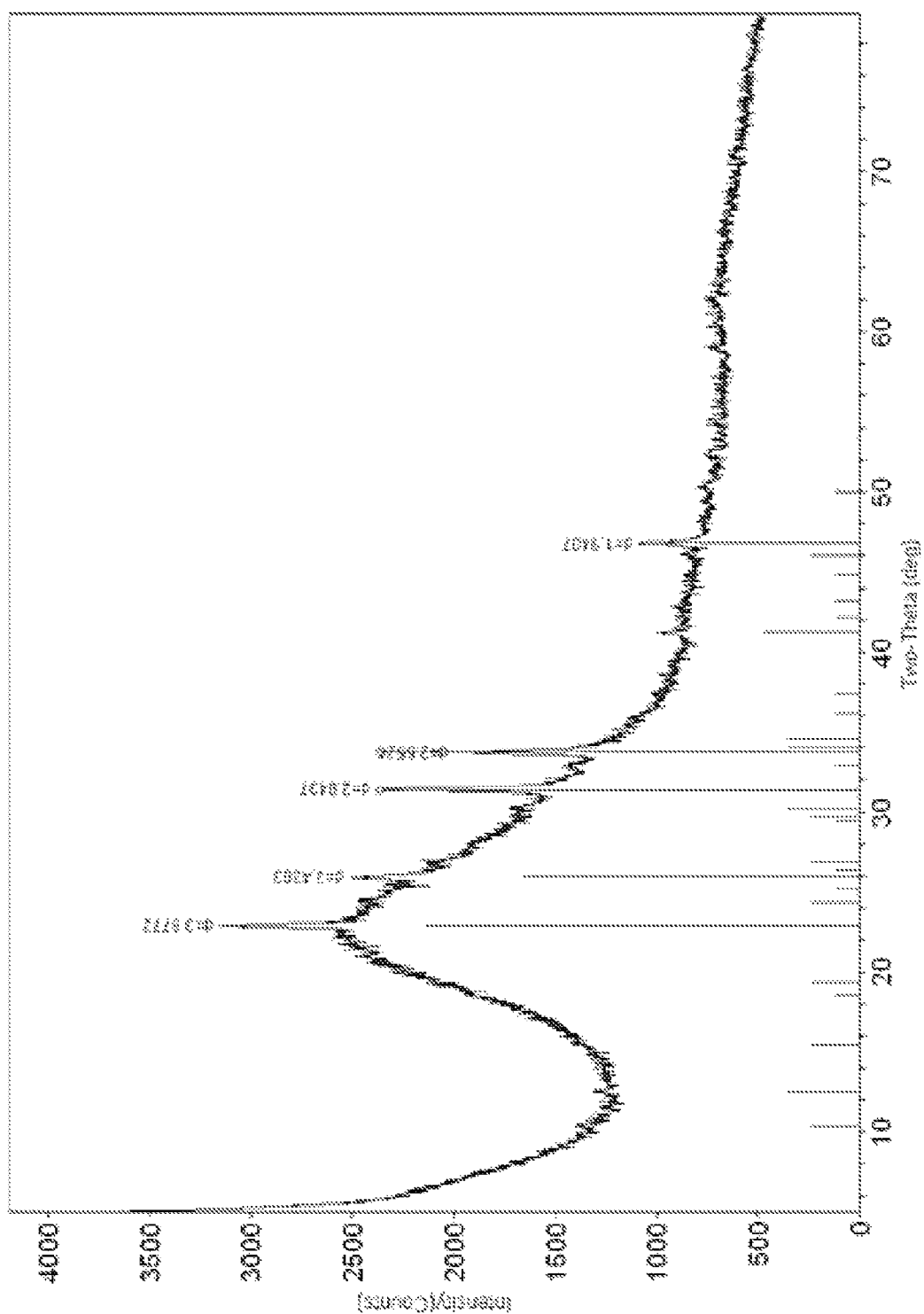
FIG. 8. shows the XRD pattern obtained for the glass of Example 85 heat treated at 700° C. for 2 hr and 800° C. for 4 hr showing the presence of sodium calcium aluminum phosphate silicate crystals and made according to aspects and/or embodiments of this disclosure.
Figure 9:
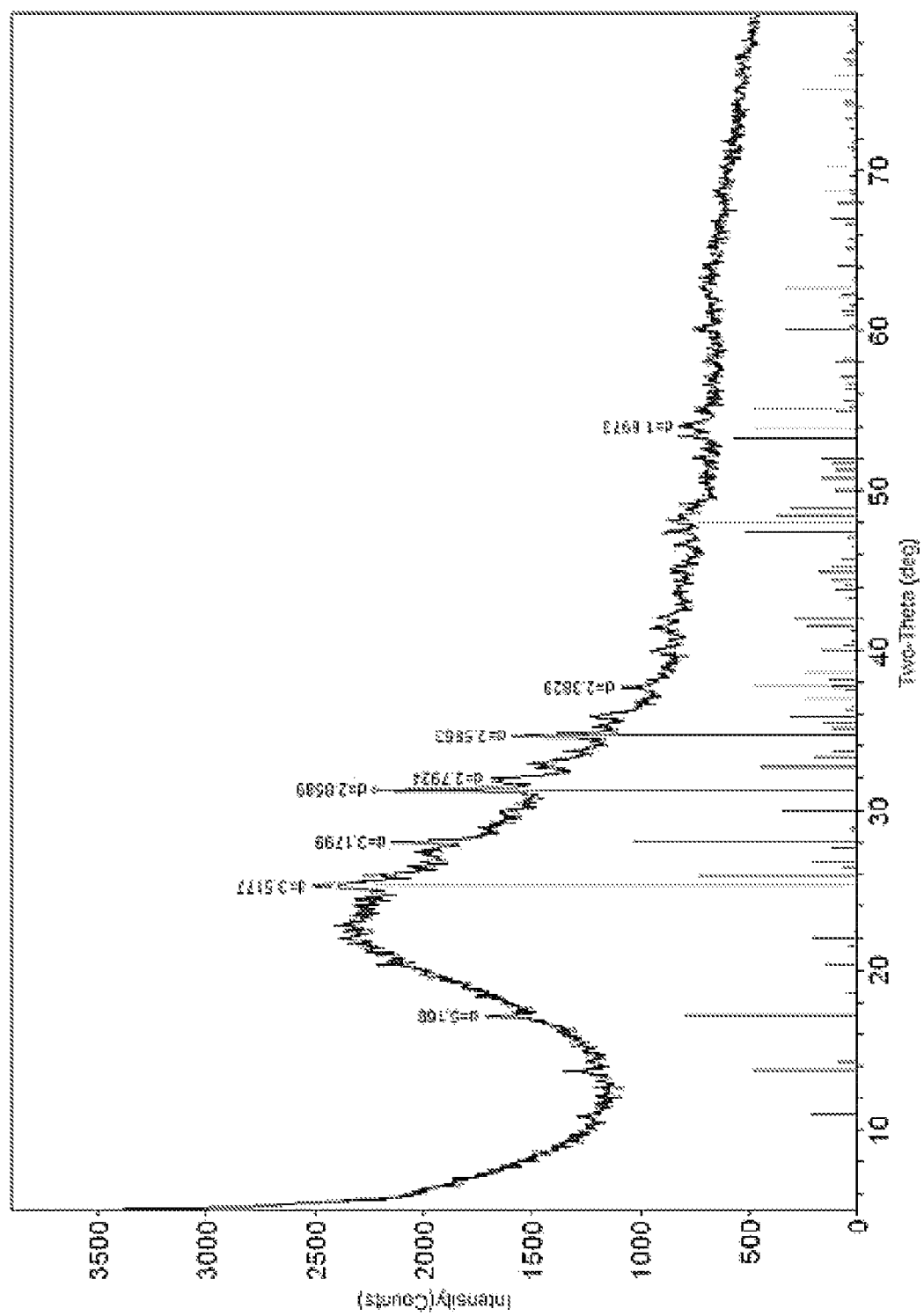
FIG. 9. shows the XRD pattern obtained for the glass of Example 88 heat treated at 700° C. for 2 hr and 850° C. for 4 hr showing the presence of whitlockite and anatase crystals and made according to aspects and/or embodiments of this disclosure.
Figure 10:
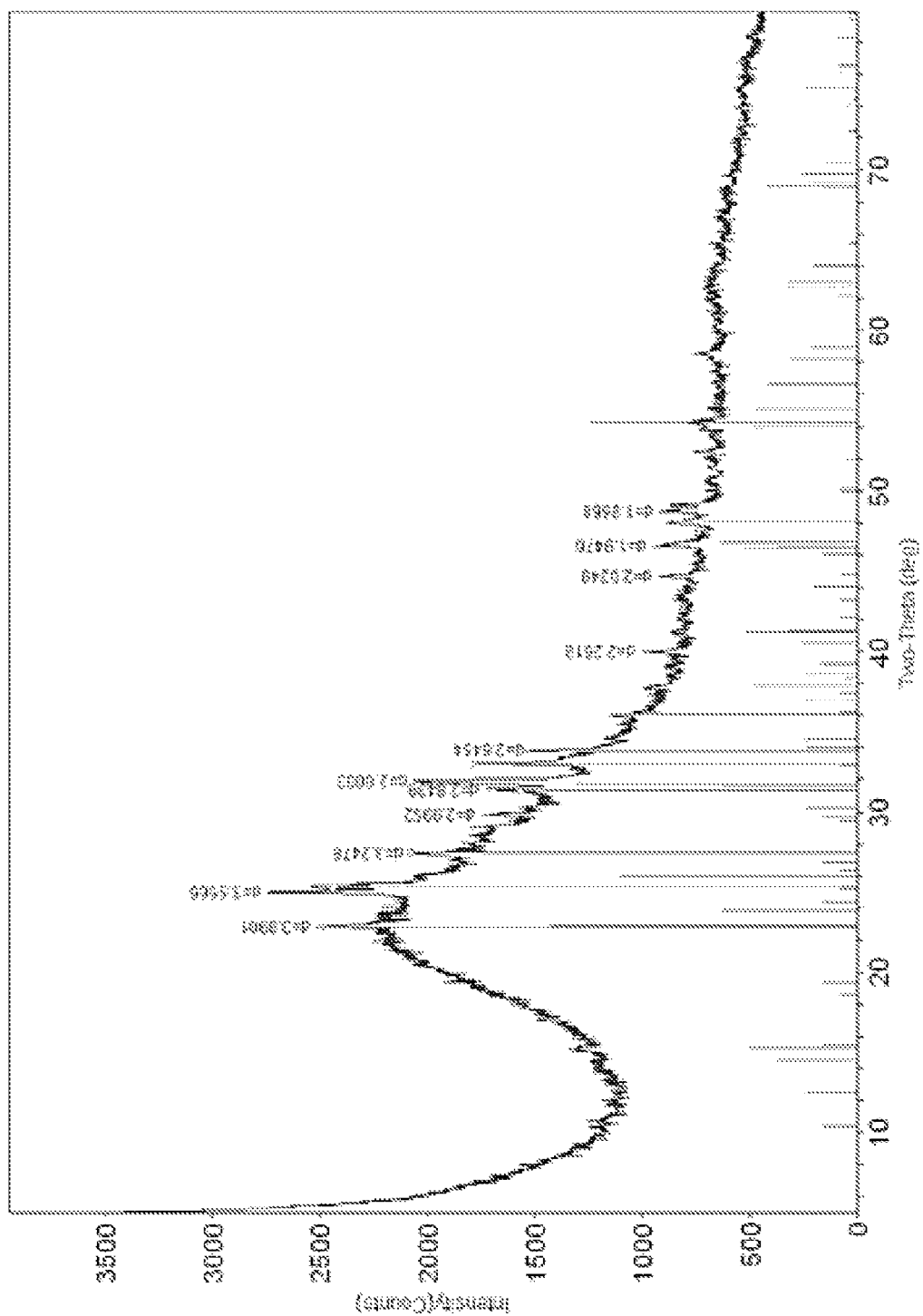
FIG. 10. shows the XRD pattern obtained for the glass of Example 89 heat treated at 700° C. for 2 hr and 800° C. for 4 hr showing the presence of five different crystalline phases demonstrating that the glass-ceramics made according to aspects and/or embodiments of this disclosure can be quite complex.
Figure 11:
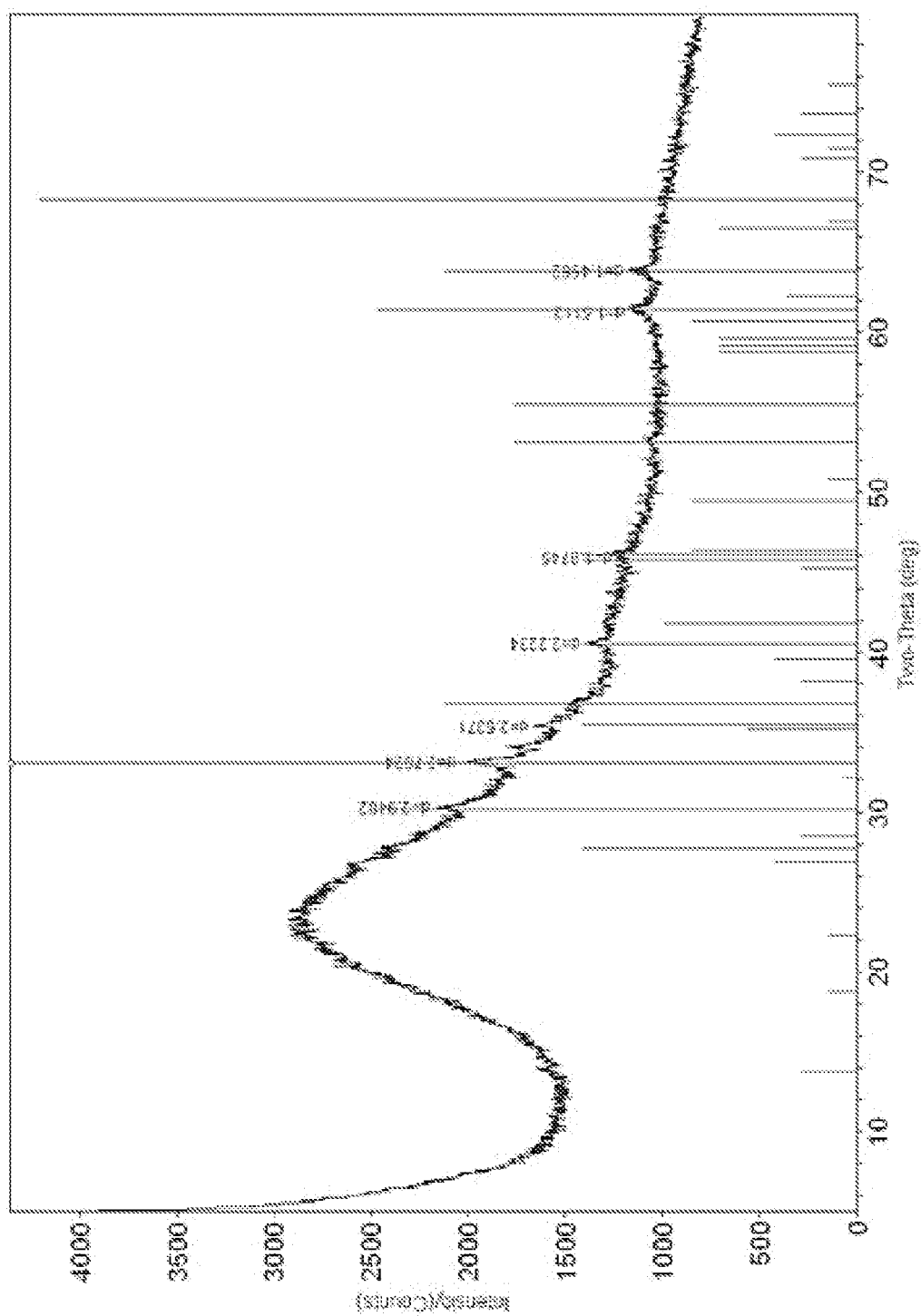
FIG. 11. shows the XRD pattern obtained for the glass of Example 50 heat treated at 630° C. for 2 hr and 800° C. for 4 hr showing the presence of epsilon-$Fe_2O_3$ and made according to aspects and/or embodiments of this disclosure.
Figure 12:
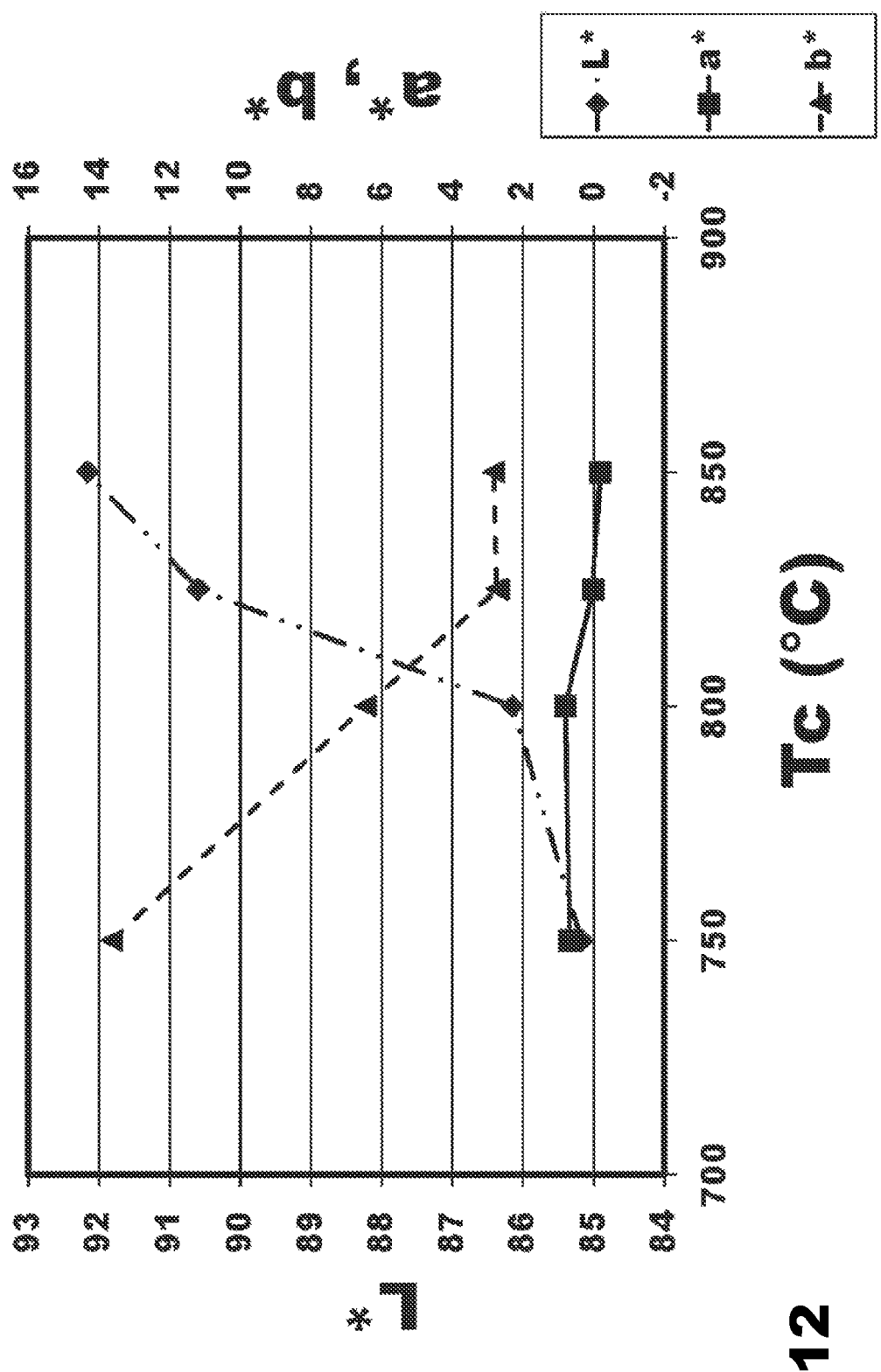
FIG. 12. shows the CIE L*a*b* color coordinates (CIE illuminant D65 and specular reflectance excluded {SCE}) as a function of peak heat treatment temperature for the glass of Example 89 heat treated using peak heat treatment temperatures from about 750° C.-850° C. and made according to aspects and/or embodiments of this disclosure.

In the following description of exemplary aspects and/or embodiments of this disclosure, reference is made to the accompanying drawings that form a part hereof, and in which are shown by way of illustration specific aspects of embodiments and/or embodiments in which this disclosure may be practiced. While these aspects of embodiments and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects of embodiments and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of this disclosure. Accordingly, the following description is not to be taken in a limiting sense, and the scope of aspects and/or embodiments of this disclosure are defined by the appended claims. It is also understood that terms such as "top," "bottom," "outward," "inward," . . . and the like are words of convenience and are not to be construed as limiting terms.

Some aspects and/or embodiments of this disclosure relate to one or more of formable and/or color-tunable, crystallizable glasses; formed and/or color-tuned glass-ceramics; IXable, formed and/or color-tuned glass-ceramics; and IX, formed and/or color-tuned glass-ceramics. In some such aspects, such crystallizable glasses are formulated to produce, upon thermal treatment, glass-ceramics including while such glass ceramics include:
  a. less than about 20 percent by weight (wt %) of one or more crystalline phases including one or more oxides; and
  b. a composition calculated on an oxide basis in percent by mole (mol %) including:
    i. $SiO_2$: about 50-76;
    ii. $Al_2O_3$: about 4-25;
    iii. $P_2O_5+B_2O_3$: about 0-14;
    iv. $R_2O$: about 0-33;
    v. one or more nucleating agents: about 0-5; and
    vi. optionally, RO: about 0-20.

Other aspects and/or embodiments of this disclosure relate to one or more process(es) for making one or more of formable and/or color-tunable, crystallizable glasses; formed and/or color-tuned glass-ceramics; IXable, formed and/or color-tuned glass-ceramics; and IX, formed and/or color-tuned glass-ceramics. In some other such aspects, mixtures of raw materials are formulated to produce, upon melting, crystallizable glasses formulated to be crystallizable to glass-ceramics including while crystallizable glasses are formulated to produce, upon thermal treatment, glass-ceramics including:
  a. less than about 20 vol % of one or more crystalline phases including one or more oxides; and
  b. a composition calculated on an oxide basis in mol % including:
    i. $SiO_2$: about 50-76;
    ii. $Al_2O_3$: about 4-25;
    iii. $P_2O_5+B_2O_3$: about 0-14;
    iv. $R_2O$: about 0-33;
    v. one or more nucleating agents: about 0-5; and
    vi. optionally, RO: about 0-20.

In some alternative aspects, such one or more of formable and/or color-tunable, crystallizable glasses; formed and/or color-tuned glass-ceramics; IXable, formed and/or color-tuned glass-ceramics; and IX, formed and/or color-tuned glass-ceramics can include compositions calculated on an oxide basis in mol % including one or more of:
  i. $SiO_2$: about 50-76; or alternatively, $SiO_2$: about 53-68; or then again, $SiO_2$: about 56-67;
  ii. $Al_2O_3$: about 4-25; or alternatively, $Al_2O_3$: about 8-20; or then again, $Al_2O_3$: about 10-18;
  iii. $P_2O_5+B_2O_3$: about 0-14; or alternatively, $P_2O_5+B_2O_3$: about 3-14; or then again, $P_2O_5+B_2O_3$: about 3-12; or alternatively then again, $P_2O_5+B_2O_3$: about 3-10;
  iv. $R_2O$: about 0-33; or alternatively, $R_2O$: about 4-24; or then again, $R_2O$: about 7-20;
  v. one or more nucleating agents: about 0-5; or alternatively, one or more nucleating agents: about 1-4; or then again, one or more nucleating agents: about 1-3; and
  vi. optionally, RO: about 0-20; or alternatively, RO: about 0-8, or then again, RO: about 0-5.

In some aspects of the above aspects and/or embodiments of, composition of such one or more of formable and/or color-tunable, crystallizable glasses; formed and/or color-tuned glass-ceramics; IXable, formed and/or color-tuned glass-ceramics; and IX, formed and/or color-tuned glass-ceramics can include, calculated on an oxide basis in mol %:
  vi. RO: about 0-20; or alternatively, RO: about 0-8; or then again, RO: about 0-5.

In some instances, $R_2O+RO-Al_2O_3$ can be about −4 to about 10; or alternatively, $R_2O+RO-Al_2O_3$ can be about −2 to about 8; or then again, $R_2O+RO-Al_2O_3$ can be about −1 to about 5. In other instances, $R_2O-Al_2O_3$ can be about −8 to about 8; or alternatively, $R_2O-Al_2O_3$ can be about −4 to about 4; or then again, $R_2O—Al_2O_3$ can be about −2 to about 2. In still other instances, $R_2O+RO—Al_2O_3$ can be about −4 to about 10; or alternatively, $R_2O+RO—Al_2O_3$ can be about −2 to about 8; or then again, $R_2O+RO—Al_2O_3$ can be about −1 to about 5 and $R_2O—Al_2O_3$ can be about −8 to about 8; or alternatively, $R_2O—Al_2O_3$ can be about −4 to about 4; or then again, $R_2O—Al_2O_3$ can be about −2 to about 2.

In some aspects of the above aspects and/or embodiments of, in such one or more of formable and/or color-tunable, crystallizable glasses; formed and/or color-tuned glass-ceramics; IXable, formed and/or color-tuned glass-ceramics; and IX, formed and/or color-tuned glass-ceramics:

$R_2O$ can be one or more of $Li_2O$, $Na_2O$, $K_2O$, $Rb_2O$, $Cs_2O$, $Cu_2O$, and $Ag_2O$; or alternatively, $R_2O$ can be one or more of $Li_2O$, $Na_2O$, $K_2O$, $Rb_2O$, $Cs_2O$, and $Cu_2O$; or then again, $R_2O$ can be one or more of $Li_2O$, $Na_2O$, and $K_2O$; or alternatively then again, $R_2O$ comprises one or more of $Na_2O$, and $K_2O$; or RO can be one or more of MgO, CaO, SrO, BaO, and ZnO; or alternatively, RO can be one or more of MgO, CaO, SrO, and BaO; or then again, RO can be one or more of MgO, CaO, and SrO; or $R_2O$ can be one or more of $Li_2O$, $Na_2O$, $K_2O$, $Rb_2O$, $Cs_2O$, $Cu_2O$, and $Ag_2O$; or alternatively, $R_2O$ can be one or more of $Li_2O$, $Na_2O$, $K_2O$, $Rb_2O$, $Cs_2O$, and $Cu_2O$; or then again, $R_2O$ can be one or more of $Li_2O$, $Na_2O$, and $K_2O$; or alternatively then again, $R_2O$ comprises one or more of $Na_2O$, and $K_2O$; while RO can be one or more of MgO, CaO, SrO, BaO, and ZnO; or alternatively, RO can be one or more of MgO, CaO, SrO, and BaO; or then again, RO can be one or more of MgO, CaO, and SrO.

In some aspects of the above aspects and/or embodiments of formed and/or color-tuned glass-ceramics; IXable, formed and/or color-tuned glass-ceramics; and IX, formed and/or color-tuned glass-ceramics such one or more crystalline phases can be less than about 20 wt %; or alternatively, less than about 15 wt %; or then again, less than about 10 wt %. In any of these, the one or more crystalline phases can include crystallites having a size less that about 300 nm; or alternatively, crystallites having a size less that about 200 nm; or then again, crystallites having a size less that about 100 nm.

In other aspects of the above aspects and/or embodiments of formed and/or color-tuned glass-ceramics; IXable, formed and/or color-tuned glass-ceramics; and IX, formed and/or color-tuned glass-ceramics, one or more silicates are substantially absent from the one or more oxide crystalline phases; or alternatively, one or more oxide crystalline phases can be, for example, one or more of $TiO_2$, FeO, $Fe_2O_3$, $Fe_3O_4$, MgO, and ZnO and, optionally, one or more transition metal oxides selected from one or more of V, Cr, Mn, Co, Ni, and Cu; or alternatively, one or more of $TiO_2$, FeO, $Fe_2O_3$, $Fe_3O_4$, MgO, and ZnO and, optionally, one or more transition metal oxides selected from one or more of V, Cr, Mn, Co, Ni, and Cu while one or more silicates are substantially absent from the one or more oxide crystalline phases; or then again, one or more of $TiO_2$, $ZrO_2$, $HfO_2$, $Ta_2O_5$, ZnO, and $Al_2O_3$ and one or more transition metal oxides selected from one or more of V, Cr, Mn, Fe, Co, Ni, and Cu; or still then again, one or more oxides can be one or more of $TiO_2$, $ZrO_2$, $HfO_2$, $Ta_2O_5$, ZnO, and $Al_2O_3$ and one or more transition metal oxides selected from one or more of V, Cr, Mn, Fe, Co, Ni, and Cu while one or more silicates are substantially absent from the one or more oxide crystalline phases.

In other aspects of the above aspects and/or embodiments of IXable, formed and/or color-tuned glass-ceramics; and IX, formed and/or color-tuned glass-ceramics, following an ion exchange (IX) treatment such glass-ceramics can have a Vickers median crack initiation threshold of at least 5 kilograms force (kgf); or alternatively, a Vickers median crack initiation threshold of at least 10 kgf; or then again, a Vickers median crack initiation threshold of at least 15 kgf; or alternatively, then again, a Vickers median crack initiation threshold comprising at least 20 kgf.

In some aspects of the above aspects and/or embodiments of formable and/or color-tunable, crystallizable glasses; formed and/or color-tuned glass-ceramics; IXable, formed and/or color-tuned glass-ceramics; and IX, formed and/or color-tuned glass-ceramics such one or more nucleating agents can be $TiO_2$ and/or $ZrO_2$. On an oxide basis in mol %, $TiO_2$ can be up to about 5; or alternatively, up to about 4. Alternatively, calculated on an oxide basis in mol % $ZrO_2$ can be up to about 3; or up to about 2. When one or more nucleating agents include $TiO_2$ and $ZrO_2$, calculated on an oxide basis in mol %, $TiO_2+ZrO_2$ can be up to about 5; or alternatively, up to about 4 while $ZrO_2$ can be up to about 3; or alternatively, up to about 2.

Still other aspects and/or embodiments of this disclosure relate to formed and/or color-tuned glass-ceramics; IXable, formed and/or color-tuned glass-ceramics; and IX, formed and/or color-tuned glass-ceramics having a color presented in CIELAB color space coordinates for CIE illuminant D65 determined from reflectance spectra measurements using a spectrophotometer with SCE with an a* coordinate from about −2 to about +8 and a b* coordinate from about −7 to about +30; or alternatively, an a* coordinate from about −2 to about +2 and a b* coordinate from about −6 to about +6; or then again, an a* coordinate from about −1 to about +1 and a b* coordinate from about −2 to about +3. In some of these aspects, a L* coordinate can approach dark colors and/or black while in other of these aspects the L* coordinate can approach light colors and/or white. For example for dark colors and/or black, presented in CIELAB color space coordinates for CIE illuminant D65 determined from reflectance spectra measurements using a spectrophotometer with SCE, a L* coordinate can be from about 0 to about 70, or alternatively, from about 0 to about 45; or then again, from about 0-10. While for example light colors and/or white, presented in CIELAB color space coordinates for CIE illuminant D65 determined from reflectance spectra measurements using a spectrophotometer with SCE, a L* coordinate can be from about 85 to about 100.

Some other aspects and/or embodiments of this disclosure relate to IXable, formed and/or color-tuned glass-ceramics and/or IX, formed and/or color-tuned glass-ceramics of the previous paragraphs. In an aspect, IXable, formed and/or color-tuned glass-ceramics are formulated to be capable of being subjected to an ion exchange treatment so as to have while the IX, formed and/or color-tuned glass-ceramics can have at least one surface under a compressive stress (σs) of at least about 200 MPa; or alternately, at least about 700 MPa; or then again, at least about 700 MPa. Such at least one compressively stressed surface can have a depth of layer (DOL) of at least about 20 μm; or alternatively, at least about 60 μm. For example, IX, formed and/or color-tuned glass-ceramics can have a part thickness of from about 0.7 millimeter (mm) up to 5 mm or more; or alternatively, from about 0.7 mm up to 2 mm or more, or, then again, from about 0.7 mm up to 1.3 mm or more as well as at least one compressively stressed layer having a DOL of at least about 20 μm up to about 150 μm; or alternatively, at least about 30 μm up to about 120 μm; or then again, at least about 40 μm up to about 100 μm.

In various aspects relating to glass-ceramics of the previous paragraphs, such glass-ceramics can have a % transmission of at least one wavelength, $\lambda_T$, in an interval of wavelengths from about 390 nm-2500 nm through an about 0.8 mm thickness less than about 90; or alternatively, less than about 70; or then again, less than about 50. In other aspects following crystallization, progeny glass-ceramics can have a % transmission of at least one wavelength, $\lambda_T$, in an interval of wavelengths from about 390 nm-2500 nm through an about 0.8 mm thickness of less than about 40, alternatively, less than about 30, then again, less than about 20. Alternatively characterized following crystallization, progeny glass-ceramics can have an average value in percent (%) of transmission over a $\lambda$ interval from about $$390 \text{ nm} - 2500 \text{ nm} \left[ {}^{2500\,nm}_{390\,nm} T_{avg}(\%) = \frac{1}{(2500 - 390 \text{ nm})} \sum_{390\,nm}^{2500\,nm} T_\lambda \{\%\} \right]$$

through an about 0.8 mm thickness of less than about 90, alternatively, less than about 70, then again, less than about 50. Alternatively characterized, in some aspects following crystallization, progeny glass-ceramics can have an average value in percent (%) of transmission over a $\lambda$ interval from about 390 nm-2500 nm $$\left[ {}^{2500\,nm}_{390\,nm} T_{avg}(\%) = \frac{1}{(2500 - 390 \text{ nm})} \sum_{390\,nm}^{2500\,nm} T_\lambda \{\%\} \right]$$

through an about 0.8 mm thickness of less than about 90, alternatively, less than about 70, then again, less than about 50. In other aspects following crystallization, progeny glass-ceramics can have an average value in percent (%) of transmission over a $\lambda$ interval from about 390 nm-2500 nm $$\left[ {}^{2500\,nm}_{390\,nm} T_{avg}(\%) = \frac{1}{(2500 - 390 \text{ nm})} \sum_{390\,nm}^{2500\,nm} T_\lambda \{\%\} \right]$$

through an about 0.8 mm thickness of less than about 40, alternatively, less than about 30, then again, less than about 20.

Still yet other aspects and/or embodiments of this disclosure relate to dielectric properties of formed and/or color-tuned glass-ceramics; IXable, formed and/or color-tuned glass-ceramics; and IX, formed and/or color-tuned glass-ceramics of the previous paragraphs. That is, in addition to such glass-ceramics having one or more preselected colors, which additionally might be tunable or have been tuned, for example, to impart one or more aesthetic colors, such glass-ceramics can possess advantageous dielectric properties, such as, a loss tangent over a frequency ranging from about 0.5-3.0 GHz at about 25° C. and/or a dielectric constant over a frequency ranging from about 0.5-3.0 GHz at about 25° C.

In various aspects relating to formable and/or color-tunable, crystallizable glasses of the previous paragraphs, compositions of such crystallizable glasses are formulated, for example, to be capable of being formed from a molten state using one or more of a float method, a slot draw method, and/or a fusion method and, optionally, subsequently a redraw method and/or roll out method. To that end in some aspects, such compositions are formulated so that such crystallizable glasses have a liquidus viscosity ($\eta_{lqds}$) of at least about 20 kP; or alternatively, at least about 50 kP; or then again, at least about 100 kP; or alternatively then again, at least about 150 kP. In some embodiments, the liquidus viscosity is in a range from about 20 kp to about 1000 kp, in other embodiments, in a range from about 50 kp to about 1000 kp, and ins still other embodiments, from about 1000 kp to about 1000 kP. In some other aspects, such compositions are formulated so that of such crystallizable glasses have a liquidus temperature ($T_{lqds}$) less than about 1600° C.; or alternatively, less than about 1400° C.; or then again, less than about 1300° C.; or alternatively, then again, less than about 1200° C.; or alternatively, then still again, less than about 1100° C. In still some other aspects, such compositions are formulated so that such crystallizable glasses have a devitrification resistant while cooling from a liquid state.

In various other aspects relating to crystallizable glasses of the previous paragraphs, their compositions can be formulated, for example, for an ease processing (e.g., melting, processing, forming . . . etc.) such crystallizable glasses. In such case, crystallizable glasses can have a % transmission of at least one wavelength, $\lambda_T$, in an interval of wavelengths from about 390 nm-2500 nm through crystallizable glasses having an about 0.8 mm thickness least about 90; or alternatively, at least about 70; or then again, at least about 50. As noted above, in some aspects following crystallization, progeny glass-ceramics can have a % transmission of at least one wavelength, $\lambda_T$, in an interval of wavelengths from about 390 nm-2500 nm through crystallizable glasses having an about 0.8 mm thickness less than about 90; or alternatively, less than about 70; or then again, less than about 50. In other aspects following crystallization, progeny glass-ceramics can have a % transmission of at least one wavelength, $\lambda_T$, in an interval of wavelengths from about 390 nm-2500 nm through an about 0.8 mm thickness of less than about 40, alternatively, less than about 30, then again, less than about 20.

Alternatively characterized, in some aspects crystallizable glasses can have an average value in percent (%) of transmission over a $\lambda$ interval from about 390 nm-2500 nm $$\left[ {}^{2500\,nm}_{390\,nm} T_{avg}(\%) = \frac{1}{(2500 - 390 \text{ nm})} \sum_{390\,nm}^{2500\,nm} T_\lambda \{\%\} \right]$$

through an about 0.8 mm thickness of at least about 50, alternatively, at least about 70, then again, at least about 90. Alternatively in other aspects, crystallizable glasses can have an average value in percent (%) of transmission over a $\lambda$ interval from about 390 nm-2500 nm $$\left[ {}^{2500\,nm}_{390\,nm} T_{avg}(\%) = \frac{1}{(2500 - 390 \text{ nm})} \sum_{390\,nm}^{2500\,nm} T_\lambda \{\%\} \right]$$

through an about 0.8 mm thickness of at least about 40, alternatively, at least about 50, then again, at least about 70.

In various aspects relating to a devitrification resistant, such crystallizable glasses can be formulated to have such resistance while cooling from a liquid. To that end, such crystallizable glasses can be formulated to have to a devitrification resistant at a viscosity ($\eta$) range of between about $10E^0$ poise (P) to $10E^{14.5}$ P; or alternatively, a viscosity ($\eta$) range of between about $10E^0$ P to $10E^{13.3}$ P; or then again, a viscosity ($\eta$) range of between about $10E^0$ P to $10E^{11.5}$ P.

In various aspects relating to crystallization, such crystallizable glasses can be formulated to be crystallizable at one or more preselected temperatures for one or more preselected times to a glass-ceramic having one or more crystalline. To that end, such crystallizable glasses can be formulated to be crystallizable to glass-ceramics having less than about 20 wt %; or alternatively, less than about 15 wt %; or then again, less than about 10 wt %. In any of these, the one or more crystalline phases can include crystallites having a size less that about 300 nm; or alternatively, crystallites having a size less that about 200 nm; or then again, crystallites having a size less that about 100 nm. In some of these aspects, crystallizable glasses can be formulated to be crystallizes to one or more crystalline phases at a viscosity ($\eta$) of at least about $10E^{10}$ P; or alternatively, a viscosity ($\eta$) of at least about $10E^9$ P; or then again, a viscosity ($\eta$) of at least about $10E^8$ P.

In various aspects relating to compositions, such crystallizable glasses can be formulated, calculated on an oxide basis in mol %, to have one or more of:
  i. $SiO_2$: about 50-76; or alternatively, $SiO_2$: about 53-68; or then again, $SiO_2$: about 56-67;
  ii. $Al_2O_3$: about 4-25; or alternatively, $Al_2O_3$: about 8-20; or then again, $Al_2O_3$: about 10-18;
  iii. $P_2O_5+B_2O_3$: about 0-14; or alternatively, $P_2O_5+B_2O_3$: about 3-14; or then again, $P_2O_5+B_2O_3$: about 3-12; or alternatively then again, $P_2O_5+B_2O_3$: about 3-10;
  iv. $R_2O$: about 0-33; or alternatively, $R_2O$: about 4-24; or then again, $R_2O$: about 7-20;
  v. one or more nucleating agents: about 0-5; or alternatively, one or more nucleating agents: about 1-4; or then again, one or more nucleating agents: about 1-3; and
  vi. optionally, RO: about 0-20; or alternatively, RO: about 0-8, or then again, RO: about 0-5.

In some aspects, composition of such crystallizable glasses include, calculated on an oxide basis in mol %:
  vi. RO: about 0-20; or alternatively, RO: about 0-8; or then again, RO: about 0-5.

Numerous other aspects and/or embodiments relating to compositions of formable and/or color-tunable, crystallizable glasses exist some of which have been discussed above without limitation including aspects and/or embodiments relating to $R_2O+RO$—$Al_2O_3$ ranges; $R_2O$—$Al_2O_3$ ranges; $R_2O$ composition(s); RO composition(s); composition(s) of one or more oxides and/or a substantial absence of silicates from the one or more oxides; coordinates in the CIELAB color space, determined from specular reflectance measurements using a spectrophotometer with illuminant D65 and specular reflectance excluded (SCE), of color(s); composition(s) of and/or ranges of one or more nucleating agents . . . etc.

In various aspects relating to colorants, such one or more one or more colorants can be formulated to be a constituent of such crystallizable glasses that, calculated on an oxide basis in mol %, can be up to about 5.2 of the crystallizable glass; or alternatively, up to about 4 of the crystallizable glass; or then again, up to about 2.8 of the crystallizable glass; or alternatively then again, up to about 1.5 of the crystallizable glass.

In some aspects, such one or more one or more colorants can be formulated to provide one or more $Fe^{2+}$ sources, one or more $Fe^{3+}$ sources; or one or more $Fe^{2+}$ sources and one or more $Fe^{3+}$ sources to crystallizable glasses and/or progeny glass-ceramics. In other aspects, such one or more one or more colorants can be formulated to provide one or more iron oxides and one or more other transition metal oxides to crystallizable glasses and/or progeny glass-ceramics. In still other aspects, such one or more one or more colorants can be, for example, one or more of $TiO_2$, FeO, $Fe_2O_3$, $Fe_3O_4$, MgO, and ZnO and, optionally, one or more transition metal oxides selected from one or more of V, Cr, Mn, Co, Ni, and Cu. In such other aspect, such one or more other transition metal oxides can be an oxide of one or more of Ti, V, Cr, Mn, Co, Ni, Cu, Zn, and Ta; or alternatively, one or more of Ti, Mn, Co, Zn, and Ta; or then again, one or more of Ti, Mn, and Co; or alternatively then again, an oxide of titanium. In still other aspects, such one or more one or more colorants can be formulated to provide one or more multivalent metal oxides and, optionally, one or more reducing agents to crystallizable glasses and/or progeny glass-ceramics. In such other aspect, such one or more multivalent metal oxides comprise an oxide of one or more of Bi, V, Sn, Ti, V, Cr, Mn, Fe, Co, Ni, Cu, and Zn; or alternatively, one or more of Sn, Ti, Mn, Fe, Co, and Zn; or then again, one or more of Ti, Mn, Fe, and Co. In each of the previous aspects, one or more silicates may be substantially absent from the one or more oxide crystalline phases.

In additional other aspects relating to one or more process(es) for making one or more of formable and/or color-tunable, crystallizable glasses; formed and/or color-tuned glass-ceramics; IXable, formed and/or color-tuned glass-ceramics; and IX, formed and/or color-tuned glass-ceramics, raw materials for making crystallizable glasses can be formulated to make crystallizable glasses capable of exhibiting one or more preselected colors. In turn, progeny glass-ceramics can be capable of exhibiting one or more preselected colors. In some of these additional other aspects, raw materials for making crystallizable glasses can be formulated to make such one or more preselected colors that can be tunable or have been tuned. Also in turn, such one or more preselected colors of progeny glass-ceramics can be tunable or have been tuned. In both of such additional other aspects, components of raw materials or ingredients might and can included preselected compositions formulated in corresponding preselected amounts that differ in their amount and/or chemical character (e.g., compound versus element and/or vice versa, carbonate versus oxide, mixed oxide versus oxide and/or vice versa, valance state . . . etc.) and/or physical character (e.g., crystalline versus. amorphous and/or vice versa, single phase versus multiphase and/or vice versa, precipitate versus in solution and/or vice versa, present versus fugitive . . . etc.) in the one or more of formable and/or color-tunable, crystallizable glasses; formed and/or color-tuned glass-ceramics; IXable, formed and/or color-tuned glass-ceramics; and IX, formed and/or color-tuned glass-ceramics.

In still other aspects relating to one or more process(es) for making one or more of formable and/or color-tunable, crystallizable glasses; formed and/or color-tuned glass-ceramics; IXable, formed and/or color-tuned glass-ceramics; and IX, formed and/or color-tuned glass-ceramics, crystallizable glasses can be formulated to be formable in one or more steps and/or by one or more means. Advantageously, crystallizable glasses formulated in such manner can be processed using mechanized means so as facilitate any of continuous, semi-continuous, and/or batch-wise processing in a manufacture of shaped parts of formable and/or color-tunable, crystallizable glasses; formed and/or color-tuned glass-ceramics; IXable, formed and/or color-tuned glass-ceramics; and/or IX, formed and/or color-tuned glass-ceramics. Non-limiting examples of shaped parts can range from sheets or fibers to one or more complex three dimensional (3D) shapes such as, for example, a concave shape, a convex shape, or any other desired predetermined geometry . . . etc. For example in the case of sheets, one or more crystallizable glass sheets can be formed from a molten state by any one of a float method; or a down draw method including slot draw or a fusion method. If desirable, such crystallizable glass sheets might be then subjected to one or more redraw methods and/or one or more roll out methods. Such one or more redraw methods and/or one or more roll out methods might be performed while the crystallizable glass sheets are in a viscous state between about $10E^{3.5}$ P to $10E^{7.6}$ P.

As noted, any aspects and/or alternative aspects relating to any of the one or more of formable and/or color-tunable, crystallizable glasses; formed and/or color-tuned glass-ceramics; IXable, formed and/or color-tuned glass-ceramics; and IX, formed and/or color-tuned glass-ceramics of the present disclosure their compositions can including in pre-specified amounts one or more of: $SiO_2$: $Al_2O_3$: $P_2O_5$: $B_2O_3$: $R_2O$: one or more nucleating agents; and, optionally, RO.

In any aspects relating to the to any of the one or more of formable and/or color-tunable, crystallizable glasses; formed and/or color-tuned glass-ceramics; IXable, formed and/or color-tuned glass-ceramics; and IX, formed and/or color-tuned glass-ceramics described herein, $SiO_2$ can be the main constituent of a glass composition and, as such, can constitute a matrix of the glass. Also, $SiO_2$ can serve as a viscosity enhancer for aiding in a glass's formability while at the same time imparting chemical durability to the glass. Generally, $SiO_2$ can be present in amounts ranging from about 50 mol % up to about 76 mol %. When $SiO_2$ exceeds about 76 mol %, a glass's melting temperature can be impractically high for commercial melting technologies and/or forming technologies. In some aspects, $SiO_2$ might range from about 53 mol % up to about 68 mol %, or, alternatively, even from about 56 mol % up to about 67 mol %.

In any aspects relating to the to any of the one or more of formable and/or color-tunable, crystallizable glasses; formed and/or color-tuned glass-ceramics; IXable, formed and/or color-tuned glass-ceramics; and IX, formed and/or color-tuned glass-ceramics described herein, described herein, such glass compositions might further include $Al_2O_3$. In some aspects, $Al_2O_3$ can be present in amounts so as to impart a resistant to devitrification to crystallizable glasses while cooling from a liquid such as, for example, from about 4 mol % to about 25 mol %. When $Al_2O_3$ exceeds about 25 mol %, the resultant mullite liquidus makes it difficult to melt and form crystallizable glasses while $Al_2O_3$ below about 4 mol % can impart an insufficient level of resistant to devitrification to crystallizable glasses while cooling from a liquid. Alternatively amounts of $Al_2O_3$ can be from about 8 mol % up to about 20 mol %; or, then again, from about 10 mol % to about 18 mol %.

In any aspects relating to the to any of the one or more of formable and/or color-tunable, crystallizable glasses; formed and/or color-tuned glass-ceramics; IXable, formed and/or color-tuned glass-ceramics; and IX, formed and/or color-tuned glass-ceramics described herein, described herein, such compositions might further include one or more of $P_2O_5$ and $B_2O_3$ (e.g., $P_2O_5+B_2O_3$) in a glass composition so as to be capable of forming charged species in a network of such composition glass that can interact with other cations in a manner so as to modify one or more properties of the resultant crystallizable glasses and/or glass-ceramics. When $P_2O_5+B_2O_3$ exceeds about 14 mol %, any benefits their the additions might not increase. Alternatively amounts of $P_2O_5+B_2O_3$ can be from about 3 mol % up to about 14 mol %; or, then again, from about 3 mol % to about 12 mol %; or then aging still, from about 3 mol % to about 10 mol %.

In any aspects relating to the to any of the one or more of formable and/or color-tunable, crystallizable glasses; formed and/or color-tuned glass-ceramics; IXable, formed and/or color-tuned glass-ceramics; and IX, formed and/or color-tuned glass-ceramics described herein, described herein, such compositions might further include $R_2O$ so as to modify a viscosity of the crystallizable glasses characterized by a high liquidus viscosity while at the same time reducing the melting temperature of the crystallizable glasses and/or enable shorter thermal treatments. Also, $R_2O$ can be used to modify viscosity of the resultant glass-ceramics. When $R_2O$ exceeds about 33 mol %, liquidus viscosity be impractically low for commercial melting technologies and/or forming technologies. Alternatively amounts of $R_2O$ can be from about 4 mol % up to about 24 mol %; or, then again, from about 7 mol % to about 20 mol %.

In any aspects relating to the to any of the one or more of formable and/or color-tunable, crystallizable glasses; formed and/or color-tuned glass-ceramics; IXable, formed and/or color-tuned glass-ceramics; and IX, formed and/or color-tuned glass-ceramics described herein, described herein, such compositions include appropriate types and amount of one or more nucleation agents to facilitate nucleation and/or growth of at least crystalline phase and any desired one or more minor crystalline phases during thermal treatment (e.g., nucleation and/or crystallization). When an amount of one or more nucleation agents exceeds about 5 mol %, there can be a diminishing return on the benefit of adding more. Alternatively amounts of one or more nucleation agents can be from about 1 mol % up to about 4 mol %; or, then again, from about 1 mol % to about 3 mol %. Among appropriate types of one or more nucleation agents are $TiO_2$, $ZrO_2$ . . . etc. while among appropriate amounts are $TiO_2$: up to 5 mole %; and/or $ZrO_2$: up to 2 mole % . . . etc. In aspects and/or embodiments, applicants have found that an inclusion of $TiO_2$ as a nucleation agent is desirable when the formation of one or more Ti-containing phases is desired to achieve a prescribed crystalline phases. In other aspects and/or embodiments, an inclusion of $ZrO_2$ as a nucleation agent can increase nucleation efficiency. Thus, types and amount of one or more nucleation agents is carefully prescribed. It is noted that in certain aspect and/or embodiments, a minimum mole % sum $[TiO_2+SnO_2]$ in excess of 1 mole % is desired as an ingredient of crystallizable glasses. In other words, effective amounts of this mole % sum $[TiO_2+SnO_2]$ are formulated as an ingredient of crystallizable glasses so that nucleation in an effective manner occurs and growth is achieved to a preselected and appropriate crystal phase assemblage. It is noted that above 5 mole % $TiO_2$ can be undesirable as the resultant high rutile liquidus has the potential of increasing difficulties during shape forming of crystallizable glasses and/or glass-ceramics.

As previously described, articles and/or machines or equipment might be formed from and/or include one or more of formable and/or color-tunable, crystallizable glasses; formed and/or color-tuned glass-ceramics; IXable, formed and/or color-tuned glass-ceramics; and/or IX, formed and/or color-tuned glass-ceramics disclosure or described herein. For example, cover sheets for electronic devices might be formed using any one of a float process, a fusion down-draw process, a slot-draw process, or any other suitable process used for forming crystallizable glasses substrates from a batch of glass raw materials. As a specific example, the one or more crystallizable glasses disclosure and described herein might be formed into glass substrates using a fusion down-draw process. Such fusion down-draw process utilizes a drawing tank that has a channel for accepting molten glass raw material. The channel has weirs that open at the top along the length of the channel on both sides of the channel. When the channel fills with molten glass, the molten glass overflows the weirs and, due to gravity, the molten glass flows down the outside surfaces of the drawing tank as two flowing glass surfaces. These outside surfaces extend downwardly and inwardly while joining at an edge below the drawing tank. The two flowing glass surfaces join at this edge and fuse to form a single flowing sheet of molten glass that may be further drawn to a desired thickness. The fusion down-draw process produces glass sheets with highly uniform, flat surfaces as neither surface of the resulting glass sheet is in contact with any part of the fusion apparatus.

As an alternative specific example, the one or more crystallizable glasses of this disclosure and described herein may be formed using a slot-draw process that is distinct from the fusion down-draw process. In the slot-draw process molten glass is supplied to a drawing tank. The bottom of the drawing tank has an open slot with a nozzle that extends the length of the slot. The molten glass flows through the slot/nozzle and is drawn downward as a continuous sheet and into an annealing region.

Some other aspects and/or embodiments of this disclosure relate to processes for making formable and/or color-tunable, crystallizable glasses and processes for making formed and/or color-tuned glass-ceramics; IXable, formed and/or color-tuned glass-ceramics; and/or IX, formed and/or color-tuned glass-ceramics. In aspects, some processes included melting a mixture of raw materials formulated to produce, upon melting, crystallizable glasses, calculated on an oxide basis in mol %, to have one or more of:

i. $SiO_2$: about 50-76; or alternatively, $SiO_2$: about 53-68; or then again, $SiO_2$: about 56-67;
ii. $Al_2O_3$: about 4-25; or alternatively, $Al_2O_3$: about 8-20; or then again, $Al_2O_3$: about 10-18;
iii. $P_2O_5+B_2O_3$: about 0-14; or alternatively, $P_2O_5+B_2O_3$: about 3-14; or then again, $P_2O_5+B_2O_3$: about 3-12; or alternatively then again, $P_2O_5+B_2O_3$: about 3-10;
iv. $R_2O$: about 0-33; or alternatively, $R_2O$: about 4-24; or then again, $R_2O$: about 7-20; and
v. one or more nucleating agents: about 0-5; or alternatively, one or more nucleating agents: about 1-4; or then again, one or more nucleating agents: about 1-3; and
vi. optionally, RO: about 0-20; or alternatively, RO: about 0-8, or then again, RO: about 0-5.

In some aspects, composition of such crystallizable glasses include, calculated on an oxide basis in mol %:

vi. RO: about 0-20; or alternatively, RO: about 0-8; or then again, RO: about 0-5.

In additional aspects, such mixture of raw materials is formulated to produce the above crystallizable glasses upon fining and homogenization molten glass compositions at a temperature between about 1400° C. and about 1650° C. Still yet other aspects included a manufacture of shaped parts as discussed above.

In these still other various aspects, processes for making formed and/or color-tuned glass-ceramics; IXable, formed and/or color-tuned glass-ceramics; and/or IX, formed and/or color-tuned glass-ceramics can occur by heat treating such crystallizable glasses at one or more preselected temperatures for one or more preselected times to induce crystallization (i.e., nucleation and growth) of one or more crystalline phases (e.g., having one or more compositions, amounts, morphologies, sizes or size distributions . . . etc.). In further aspects, processes for making can include (i) heating crystallizable glasses at a rate of 1-10° C./min to a nucleation temperature (Tn) ranging between 600° C. and 810° C.; (ii) maintaining the crystallizable glasses at the nucleation temperature for a time ranging between ¼ hr-4 hr to produce nucleated crystallizable glasses; (iii) heating the nucleated crystallizable glasses at a rate of 1-10° C./min to a crystallization temperature (Tc) ranging between 675° C. and 1000° C.; (iv) maintaining the nucleated crystallizable glasses at the crystallization temperature for a time ranging between about ¼ hr-4 hr to produce formed and/or color-tuned glass-ceramics and/or IXable, formed and/or color-tuned glass-ceramics; and (v) cooling the formed and/or color-tuned glass-ceramics and/or IXable, formed and/or color-tuned glass-ceramics to room temperature.

Temperature-temporal profile of steps (iii) and (iv), in addition to crystallizable glass compositions, are judiciously prescribed so as to produce the desired crystalline phases; desired proportions of one or more predominate crystalline phases and/or one or more minor crystalline phases and residual glass; desired crystal phase assemblages of one or more predominate crystalline phases and/or one or more minor crystalline phases and residual glass; desired grain sizes or grain size distributions among one or more predominate crystalline phases and/or one or more minor crystalline phases; and, hence the final integrity, quality, color, and/or opacity, of resultant formed and/or color-tuned glass-ceramics and/or IXable, formed and/or color-tuned glass-ceramics according to aspects and/or embodiments of this disclosure.

The resultant glass-ceramic sheets can then be reformed by pressing, blowing, bending, sagging, vacuum forming, or other means into curved or bent pieces of uniform thickness. Reforming can be also be done before thermally treating or the forming step can also serve as a thermal treatment step where both forming and thermally treating are performed substantially simultaneously. For Example a crystallizable glass might be formed into a 3D shape by forming the crystallizable glass into tubing and thermally treating the 3D crystallizable glass to transforming it into black, 3D glass-ceramic tubing. In aspects, the forming might precede the transforming, or the transforming might precede the forming, or the transforming might occur substantially simultaneously with the forming.

In yet other various aspects relating to formable and/or color-tunable, crystallizable glasses, such compositions can be formulated, for example, so that such formed and/or color-tuned glass-ceramics described in the previous paragraphs are capable of being transformed to IX, formed and/or color-tuned glass-ceramics described in the previous paragraphs using one or more preselected ion exchange techniques. In these yet other various aspects, ion exchange can occur by subjecting one or more surfaces of such formed and/or color-tuned glass-ceramics to one or more ion exchange (IX) bath having one or more preselected composition at one or more preselected temperatures for one or more preselected times to impart to one or more surfaces with one or more compressive stresses (σs) and/or one or more average surface compressions (CSavg), and/or one or more depths of layer (DOL). In a more particular embodiment the housing or enclosure can exhibit an overall part thickness of from about 0.7 millimeter (mm) up to 5 mm or more; or alternatively, from about 0.7 mm up to 2 mm or more, or, then again, from about 0.7 mm up to 1.3 mm or more and compressive layer exhibiting a DOL of 40 nm with that compressive layer exhibiting a compressive stress ($\sigma_s$) of at least 500 MPa. Again any IX process which achieves these features is suitable.

In still yet other aspects and/or embodiments, formed and/or color-tuned glass-ceramics; IXable, formed and/or color-tuned glass-ceramics; and/or IX, formed and/or color-tuned glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, formed and/or color-tuned glass-ceramics; IXable, formed and/or color-tuned glass-ceramics; and/or IX, formed and/or color-tuned glass-ceramics might be used in automotive, appliances, and even architectural applications.

As used herein, the term "ion-exchange strengthened" means that a glass-ceramic, disclosure or described herein, is strengthened by one or more ion-exchange (IX) processes as might be known in the art of glass manufacturing. Such IX processes can include, but are not limited to, communicating at least one surface of a glass-ceramic article and at least one ion source. The glass-ceramic articles are made using the one or more formable and/or color-tunable, crystallizable glasses; formed and/or color-tuned glass-ceramics; IXable, formed and/or color-tuned glass-ceramics; and/or IX, formed and/or color-tuned glass-ceramics of this disclosure. The at least one ion source provides one or more ions having an ionic radius larger than the ionic radius of one or more ions present in the glass-ceramic's at least one surface. In this manner, ions having smaller radii can replace or be exchanged with ions having larger radii in the glass-ceramic's at least one surface. Communication can be effected at a temperature within a range of temperatures at which ion inter-diffusion (e.g., the mobility of the ions from the at least one ion source into the glass-ceramic's surface and the ions to be replaced from the glass-ceramic's surface) is sufficiently rapid within a reasonable time (e.g., between about 1 hr and 64 hr ranging at between about 300° C. and 500° C.). Also, typically such temperature is below the glass transition temperature (Tg) of any glass of a glass-ceramic when it is desired that, as a result of such communication, a compressive stress ($\sigma$s) and/or CSavg and/or CSavg ca be attained in the glass-ceramic's at least one surface. Also, Some examples of ion-exchange include: ions of sodium ($Na^+$), potassium ($K^+$), rubidium ($Rb^+$), and/or cesium ($Cs^+$) being exchanged for lithium ($Li^+$) ions of glass-ceramics including lithium; ions of potassium ($K^+$), rubidium ($R^+$), and/or cesium ($Cs^+$) being exchanged for sodium ($Na^+$) ions of glass-ceramics including sodium; ions of rubidium ($R^+$) and/or cesium ($Cs^+$) being exchanged for potassium ($K^+$) ions of glass-ceramics including potassium . . . etc. Some examples of at least one ion source include one or more gaseous ion sources, one or more liquid ion sources, and/or one or more solid ion sources. Among one or more liquid ion sources are liquid and liquid solutions, such as, for example molten salts. For example for the above ion-exchange examples, such molten salts can be one or more alkali metal salts such as, but not limited to, one or more halides, carbonates, chlorates, nitrates, sulfites, sulfates, or combinations of two or more of the proceeding. As a further example for the above ion-exchange examples, such one or more alkali metal salts can include, but not be limited to, a molten salt bath including potassium nitrate ($KNO_3$) communicated with the glass's at least one surface. Such communication can be effected at a preselected temperature (e.g., between about 300° C. and 500° C.) for a preselected time (e.g., between about 1 hr and 64 hr) so as to effected the exchange of potassium ($K^+$) ions for any one of lithium ($Li^+$) ions and/or sodium ($Na^+$) ions in the glass's at least one surface so as to strengthen it. A preselected molten salt bath composition for as well as a preselected temperature and a preselected time at which communication is to be effected can be varied depending on a magnitude of compressive stress ($\sigma$s) and/or CSavg and/or DOL one desires to attains in the glass-ceramic's at least one surface.

It should be noted that in addition to single step IX processes, multiple step IX processes can be utilized to enhanced a glass-ceramic's performance. In some aspects, single step IX processes can be accomplished by exchanging ion (particularly lithium-for-sodium ion exchange) in the glass-ceramic's at least one surface by placing a glass-ceramic article in $NaNO_3$ baths at between about 300° C. and 500° C. for between about 1 hr and 64 hr. In other aspects, single step IX processes can be accomplished by placing a glass-ceramic article in a mixed potassium/sodium baths at (e.g. a 80/20 $KNO_3/NaNO_3$ bath; or alternatively, a 60/40 $KNO_3/NaNO_3$ bath; or then again, a 50/50 $KNO_3/NaNO_3$ bath . . . etc.) at between about 300° C. and 500° C. for between about 1 hr and 64 hr. In still other aspects, two-step IX process can be accomplished by first placing a glass-ceramic article in a Li-containing salt bath (e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath) between about 300° C. and 500° C. for between about 1 hr and 64 hr followed by placing the IX, glass-ceramic article in a Na-containing salt bath between about 300° C. and 500° C. for between about 1 hr and 64 hr. The first step of the two step IX process functions to replace the larger sodium ions in the in the glass-ceramic's at least one surface with the smaller lithium ions found in the Li-containing salt bath. The second step of the two step IX process functions to exchange Na into in the glass-ceramic's at least one surface.

Characterization of Formable and/or Color-Tunable, Crystallizable Glass(es); Formed and/or Color-Tuned Glass-Ceramic(s); IXable, Formed and/or Color-Tuned Glass-Ceramic(s); and/or IX, Formed and/or Color-Tuned Glass-Ceramic(s)

CIELAB color space coordinates (e.g., CIE L*; CIE a*; and CIE b*; or CIE L*, a*, and b*; or L*, a*, and b*) for describing a color of formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure were determined by methods known to those in the art from total reflectance—specular included—measurements, such as, those described by F. W. Billmeyer, Jr., "Current American Practice in Color Measurement," Applied Optics, Vol. 8, No. 4, pp. 737-750 (April 1969), which are incorporated by reference herein, at http://www.xphotonics.com/tech/Color%20Measurement/Current%20American%20Practice%20in%20Color%20Measurement.pdf. Namely, specular reflectance excluded (SCE) measurements were made of surfaces prepared to an optical polish using sample disks measuring about 33 mmØ×8 mm thick. Equipment and supplies for making such SCE measurements and translating results to obtain L*; a*; and b* color space coordinates included:

a ultraviolet-visible-near infrared (UV-VIS-NIR) spectrophotometer equipped with integrating sphere such as the commercially available Varian Cary 5G or PerkinElmer Lambda 950 UV-VIS-NIR spectrophotometers (see e.g., LAMBDA™ UV/Vis/NIR and UV/Vis spectrophotometers—950, 850, and 650; Applications and Use of Integrating Spheres; and High Performance Lambda Spectroscopy Accessories brochures, which are incorporated by reference herein, at http://www.perkinelmer.com.cn/CMSResources/Images/46-131732BRO_Lambda 950850650Americas.pdf; http://www.perkinelmer.com/CMSResources/Images/44-74191APP_LAMBDA650IntegratingSpheres.pdf; and http://www.labsphere.com/uploads/LambdaSpectroscopyBrochure.pdf, respectively) appropriately equipped and configured so as to be enabled for SCE measurements in the wavelength range 250-3300 nm (e.g., ultraviolet (UV: 300-400 nm), visible (V is: 400-700 nm), and infrared (IR: 700-2500 nm); and an analytical software (UV/VIS/NIR application pack of the GRAMS spectroscopy software suite commercially available from Thermo Scientific West Palm Beach, Fla., US; see e.g., GRAMS-UG1009 brochure, which is incorporated by reference herein, at https://www.thermo.com/eThermo/CMA/PDFs/Product/productPDF_24179.pdf) for color measurements coupled to a UV-VIS-NIR spectrophotometer that translated measurement results to the CIELAB color space coordinates (L*; a*; and b*) based on D65 illuminant and a 10-degree standard observer.

Viscosity of formable and/or color-tunable, crystallizable glasses according to aspects and/or embodiments of this disclosure can be by methods know to those in the art, such as, those described in ASTM C965-96 (and its progeny, all herein incorporated by reference) "Standard Practice for Measuring Viscosity of Glass Above the Softening Point;" ASTM C1351M-96 (and its progeny, all herein incorporated by reference) "Standard Test Method for Measurement of Viscosity of Glass Between 10E4 Pa·s and 10E8 Pa·s by Viscous Compression of a Solid Right Cylinder;" and ASTM C1350M-96 (and its progeny, all herein incorporated by reference) "Standard Practice for Measuring Viscosity of Glass Between Softening Point and Annealing Range (Approximately 10E8 Pa·s to Approximately 10E13 Pa·s)," ASTM International, Conshohocken, Pa., US. Note that 1 pascal second (Pa·s)=10 poise (P).

The dielectric parameters (e.g., loss tangent, dielectric constant . . . etc.) for formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure were characterized at room temperature by methods know to those in the art, such as, those done with a open-ended coaxial probe similar to that outlined in J. Baker-Jarvis, et al., "High-Frequency Dielectric Measurements," IEEE Instrum. Meas. Mag., pp. 24-31, April 2010; J. Baker-Jarvis et al., "Analysis of an Open-Ended Coaxial Probe," IEEE Trans. Instrum. Meas., vol. 43. no. 5, pp. 711-718 (October 1994); J. Baker-Jarvis et al. "Transmission/Reflection and Short-Circuit Line Methods for Measuring Permittivity and Permeability," Natl. Inst. Stand. Technol. Tech. Note 1355-R, 236 pages (December 1993); and J. Baker-Jarvis et al. "Dielectric and Conductor-Loss Characterization and Measurements on Electronic Packaging Materials," Natl. Inst. Stand. Technol. Tech. Note 1520, 156 pages (July 2001), which are incorporated by reference herein, at http://whites.sdsmt.edu/classes/ee692gwmm/notes/Baker-Jarvis_IMM_2010.pdf; http://www.eeel.nist.gov/advanced_materialspublications/Baker-Jarvis %20IM%2094.pdf; http://www.eeel.nist.gov/advanced_materialspublications/Baker-Jarvis %20TN%201355-R.pdf and http://whites.sdsmt.edu/classes/ee692gwmm/additional/NIST_Tech-Note_1520.pdf, respectively. Those in the art will appreciate that in the laboratory, dielectric parameters can be measured by different methods employing various sample sizes and shapes (see, for example, J. Baker-Jarvis, et al., "High-Frequency Dielectric Measurements," IEEE Instrum. Meas. Mag., pp. 24-31, April 2010; Agilent Application Note: "Basics of Measuring the Dielectric Properties of Materials," Brochure No: 5989-2589EN, Agilent Technologies, Inc., Apr. 28, 2005 (at http://whites.sdsmt.edu/classes/ee692gwmm/additional/Agilent_Basics_dielectric_properties.pdf); H. E. Bussey, "Measurement of RF Properties of Materials. A Survey", Proc. IEEE, vol. 55, pp. 1046-1053, 1967 (at http://ieeexplore.ieee.org/xpl/login.jsp?reload=true&tp=&arnumber=1447649&url=http%3A%2F%2F); J. Baker-Jarvis et al., "Measuring the Permittivity and Permeability of Lossy Materials: Solids, Liquids, Metals, Building Materials, and Negative-index Materials", Natl. Inst. Stand. Technol. Tech. Note 1536, 2004 (at http://www.eeel.nist.gov/advanced_materialspublications/Baker-Jarvis %20TN1536.pdf), which are incorporated by reference herein. The measurement technique depends on the frequency of interest. At frequencies up to several MHz a capacitive technique is typically employed. The material is placed in between the plates of a capacitor, and from the measurements of capacitance, the dielectric constant can be calculated. The capacitance model works well if the wavelength is much longer than the conductor separation.

Identity of Phase assemblages and/or crystalline sizes for formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure were determined by XRD analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure were determined by analytical techniques know to those in the art, such as, electron microprobe (EMP); x-ray photoluminescence spectroscopy (XPS); secondary ion mass spectroscopy (SIMS) . . . etc.

Compressive stress ($\sigma_s$) in a surface layer, average surface compression (CSavg), and depth of layer (DOL) of materials that are transparent can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan (see e.g., FSM-30 Surface Stress Meter Brochure, Cat no. FS-0013E at http://www.orihara-ss.co.jp/catalog/fsm/fsm-30-Ecat.pdf; FSM-60 Surface Stress Meter Brochure, Cat no. FS-0013E at http://www.luceo.co.jp/english/pdf/FSM-60LE%20Ecat.pdf; FSM-6000LE Surface Stress Meter Brochure, Revision 2009.04 at http://www.luceo.co.jp/english/pdf/FSM-6000LE%20Ecat.pdf; FSM-7000H Surface Stress Meter Brochure, Cat no. FS-0024 2009.08 at http://www.luceo.co.jp/catalog/catalog-pdf/FSM-7000H_cat.pdf; T. Kishii, "Surface Stress Meters Utilising the Optical Waveguide Effect of Chemically Tempered Glasses," Optics & Lasers in Engineering 4 (1983) pp. 25-38 at http://www.orihara-ss.co.jp/data/literature01/A034.pdf; and K. Kobayashi et al., "Chemical Strengthening of Glass and Industrial Application," 昭和52年 (1977) [52 (1977)], pp.

109-112 at http://www.orihara-ss.co.jp/data/literature01/A001.pdf, all of which are incorporated by reference herein). Glasses described in this application can be sufficiently transparent prior to thermal treatment to enable the use of an FSM-type measurement operating in the visible. CS and DOL of the final colored, opaque part can be estimated from that measurement.

Figure 13:
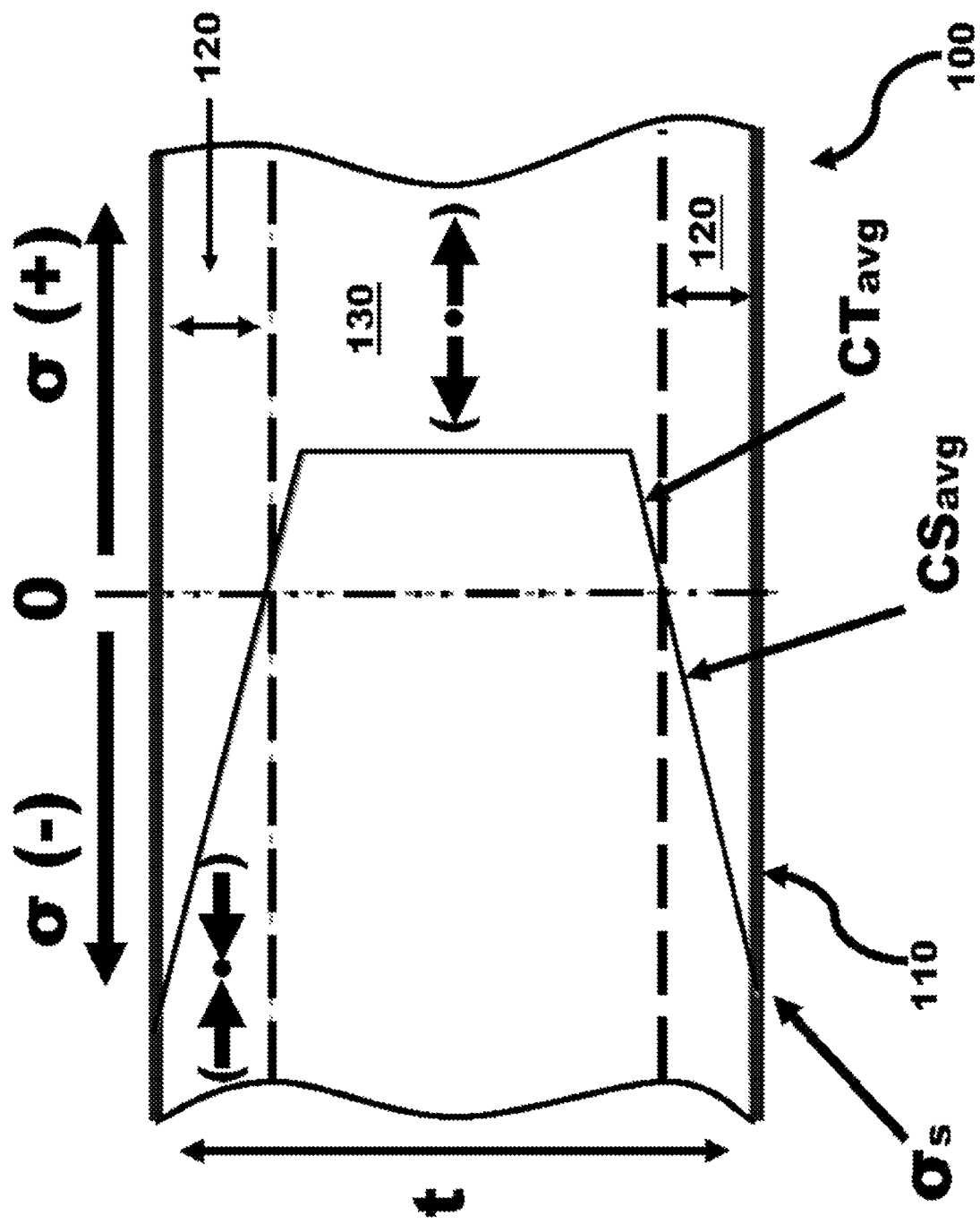
FIG. 13 shows a schematic illustration of a cross section of an IX, glass-ceramic and associated characterizing parameters: compressive stress ($\sigma_s$) in the IX, glass-ceramic's surface layer; average surface compression (CSavg); average central tension (CTavg); sample thickness (t); and depth of layer (DOL which is the perpendicular distance from the surface of the sample to the location within the sample at which the stresses changes sign {i.e., zero} resulting from surface compression and central tension) that can be determined from, for example, the sodium (Na) and/or potassium (K) concentration.
Figure 14:
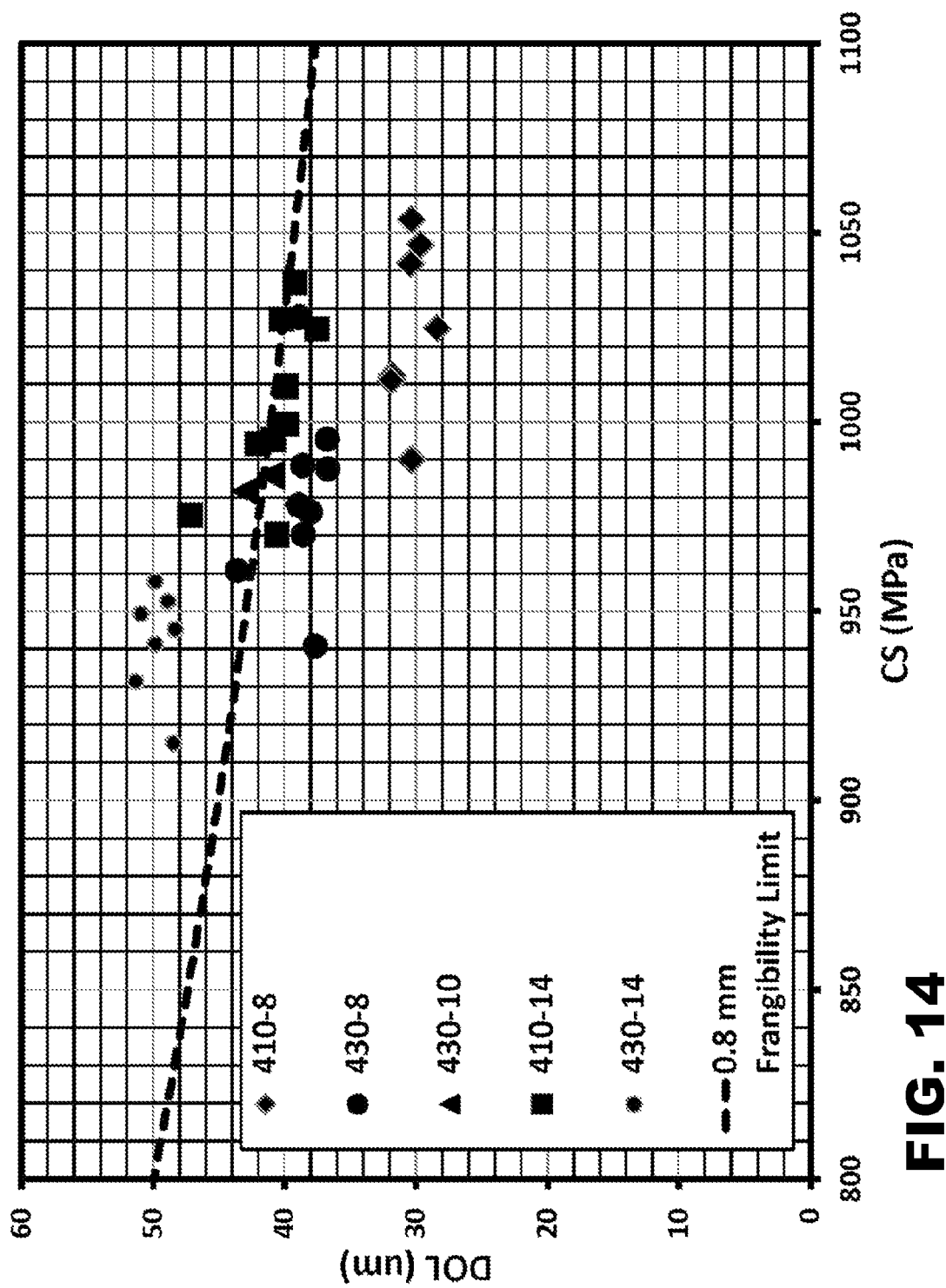
FIG. 14. shows DOL as a function of CSavg for Examples made according to aspects and/or embodiments of this disclosure.

Because of the opacity of formed and/or color-tuned glass-ceramics; IXable, formed and/or color-tuned glass-ceramics; and/or IX, formed and/or color-tuned glass-ceramics of this disclosure, the techniques for measuring CSavg using surface stress meters as discussed above are sometimes not available currently but could be in the future. Accordingly, CSavg can be obtained by selectively etching samples of IX, formed and/or color-tuned glass-ceramics such that a curvature is induced in the sample. The extent of the induced curvature expressed by the etched sample relates to the compressive stress ($\sigma_s$). By successively selectively etching a sample, measuring induced curvatures, and determining the corresponding compressive stresses ($\sigma_s$), a stress profile for the sample can be developed. DOL can also be obtained in this way (see e.g., V. M. Sglavo et al., "Procedure for Residual Stress Profile Determination by Curvature Measurements," Mechanics of Materials, 37 (2005) pp. 887-898 available at http://www.sciencedirect.com/, which is incorporated by reference herein). During an IX processes as discussed above, ions having a smaller ionic radius present in the glass-ceramic surface and/or bulk can be exchanged with ions having a larger ionic radius. As schematically illustrated in FIG. 13, when this results in compressive stress ($\sigma_s$) in the surface 110 of a sample 100, balancing tensile stresses are induced in a central region 130 of the sample 100 to balance the forces throughout the sample 100. The CSavg is related to the average central tension (CTavg) by the following relationship:

$$CSavg=CTavg \times (t-2DOL)/DOL;$$

where t is the thickness of the glass-ceramic sample 100 and

DOL (depth of layer 120) is the distance from the surface 110 of the sample 100 along a normal to the surface 110 to the location at which the stresses within the sample 100 change sign (i.e., zero).

For a sample 100, the integrated central tension (ICT) is given by the integral of stress throughout the tensile portion of the stress profile (i.e., central region 130 of the sample 100). ICT is related to the full thickness (t) of the sample 100, the depth of layer (DOL) 120 of the compressive stress layer, the average central tension (CTavg), and the shape or profile of the compressive stress layer by the following relationship:

$$ICT=CT \times (t-2DOL),$$

where the thickness (t−2DOL) of the central region 130 is a direction perpendicular to the surface. To balance forces within the sample 100, the integrated surface compression (ICS) has the same magnitude as the ICT, but has an opposite (minus) sign, since the overall integrated stress of the sample must be zero: −ICS+ICT=0. ICS is related to the DOL 120 of the compressive stress layer, the CSavg, and the shape or profile of the compressive stress layer by the following relationship: ICS=CSavg×DOL, where the DOL of the compressive stress region has be defined above (i.e., the distance from the surface 110 of the sample 100 along a normal to the surface 110 to the location at which the stresses within the sample 100 change sign (i.e., zero)). Making the appropriate substitutions and solving for CSavg yields the above relationship. Using standard descriptions of diffusion and stress, a model as a function various process conditions (e.g., temperature, time, replacing ions, replaced ions . . . etc.) can and has been developed. A mutual diffusivity (i.e., effective diffusivity or interdiffusion coefficient related to motion of both replacing ions and replaced ions in opposite directions) is fitted to their measured concentration profiles from known process conditions. These mutual diffusivity follows an Arrhenius relationship that has an exponential dependence on the reciprocal temperature (the logarithm of the mutual diffusivity is proportional to 1/T), as is known those in the art. The boundary conditions for the diffusion calculation are based on the IX bath composition and the starting composition of the sample. For a given diffusivity, sample geometry (e.g., sheet), sample or sheet thickness, and IX bath composition (e.g., salt bath composition), solution of the resulting one-dimensional diffusion equation proceeds along the lines given, for example, in "The Mathematics of Diffusion," 2nd ed., 1975, by J. Crank. The stress is then proportional to the concentration of the replacing ions or replaced ions in the sample after the IX processing steps are completed, as described, for example in, "Fundamentals of Inorganic Glasses," 2nd ed., 2006, by A. K. Varshneya. In order to obey force equilibrium, it might be necessary to subtract a constant so that the resulting stress curve integrates to zero.

Vickers indentation cracking threshold measurements performed to identify the threshold at which cracks initiate in a surface of formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure is known in the art and described, for example, in pages 130-132 of "Materials Science and Engineering (third edition)" by William D. Callister (John Wiley & Sons, New York, 1994), which are incorporated by reference herein. Unless otherwise specified, the Vickers indentation cracking threshold measurements described herein are performed by applying and then removing an indentation load using a Vickers indenter (a=68.00°) to a glass surface at 0.2 mm/min. The indentation maximum load is held for 10 seconds. The indentation cracking threshold is defined as the indentation load at which greater than 50% of 10 indents exhibit any number of radial/median cracks emanating from the corners of the indent impression. The maximum load is increased until such threshold is met for a given glass composition. Vickers indentation cracking threshold measurements are performed at room temperature in 50% relative humidity.

Flexural Strength of formable, crystallizable glass(es), color-tuned glass-ceramic(s), and/or IX, color-tuned glass-ceramic(s) according to aspects and/or embodiments of this disclosure can be characterized by methods know to those in the art, such as, those described in ASTM C1499 (and its progeny, all herein incorporated by reference) "Determination of Monotonic Equibiaxial Flexural Strength Advanced Ceramics," ASTM International, Conshohocken, Pa., US.

Young's Modulus, Shear Modulus, and Poisson's Ratio of formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure can be characterized by methods know to those in the art, such as, those described in ASTM C1259 (and its progeny, all herein incorporated by reference) "Standard Test Method for Dynamic Young's Modulus, Shear Modulus, and Poisson's Ratio for Advanced Ceramics by Impulse Excitation of Vibration," ASTM International, Conshohocken, Pa., US.

Knoop hardness of formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure can be characterized by methods know to those in the art, such as, those described in ASTM C1326 (and its progeny, all herein incorporated by reference) "Standard Test Methods for Vickers Indentation Hardness of Advanced Ceramics," ASTM International, Conshohocken, Pa., US.

Vickers hardness of formable and/or color-tunable, crystallizable glasses; formed and/or color-tuned glass-ceramics; IXable, formed and/or color-tuned glass-ceramics; and/or IX, formed and/or color-tuned glass-ceramics according to aspects and/or embodiments of this disclosure can be characterized by methods know to those in the art, such as, those described in ASTM C1327 (and its progeny, all herein incorporated by reference) Standard Test Methods for Vickers Indentation Hardness of Advanced Ceramics," ASTM International, Conshohocken, Pa., US.

EXAMPLES

The following examples illustrate the advantages and features of this disclosure and in are no way intended to limit this disclosure thereto.

Inasmuch as the sum of the individual constituents totals or very closely approximates 100, for all practical purposes the reported values may be deemed to represent weight percent (wt %). The actual crystallizable glass batch ingredients may comprise any materials, either oxides, or other compounds, which, when melted together with the other batch components, will be converted into the desired oxide in the proper proportions.

TABLE Ia

| Example | SiO$_2$ | Al$_2$O$_3$ | B$_2$O$_3$ | P$_2$O$_5$ | Na$_2$O | MgO | CaO | SnO$_2$ | TiO$_2$ | ZrO$_2$ | Fe$_2$O$_3$ | Co$_3$O$_4$ | MnO$_2$ | R$_2$O—Al$_2$O$_3$ | R$_2$O + RO— Al$_2$O$_3$ | TiO$_2$/Fe$_2$O$_3$ |
|---|---|---|---|---|---|---|---|---|---|---|---|---|---|---|---|---|
| 1 | 63.37 | 13.65 | 5.01 | 0 | 13.48 | 2.33 | 0 | 0 | 0 | 0 | 2.16 | 0 | 0 | −0.18 | 2.16 | 0 |
| 2 | 64.64 | 12.84 | 5.11 | 0 | 14.84 | 0.70 | 0 | 0.08 | 0 | 0 | 1.8 | 0 | 0 | 2.00 | 2.70 | 0 |
| 3 | 64.64 | 13.34 | 5.11 | 0 | 14.34 | 0.70 | 0 | 0.08 | 0 | 0 | 1.8 | 0 | 0 | 1.00 | 1.70 | 0 |
| 4 | 64.64 | 13.84 | 5.11 | 0 | 13.84 | 0.70 | 0 | 0.08 | 0 | 0 | 1.8 | 0 | 0 | 0.00 | 0.70 | 0 |
| 5 | 64.64 | 14.34 | 5.11 | 0 | 13.34 | 0.70 | 0 | 0.08 | 0 | 0 | 1.8 | 0 | 0 | −1.00 | −0.30 | 0 |
| 6 | 64.64 | 14.84 | 5.11 | 0 | 12.84 | 0.70 | 0 | 0.08 | 0 | 0 | 1.8 | 0 | 0 | −2.00 | −1.30 | 0 |
| 7 | 62.64 | 13.84 | 5.11 | 0 | 13.84 | 0.70 | 0 | 0.08 | 2 | 0 | 1.8 | 0 | 0 | 0.00 | 0.70 | 1.11 |
| 8 | 65.22 | 14.97 | 5.16 | 0 | 12.95 | 0.71 | 0 | 0.08 | 0 | 0 | 0.91 | 0 | 0 | −2.02 | −1.31 | 0 |
| 9 | 65.03 | 14.93 | 5.14 | 0 | 12.91 | 0.70 | 0 | 0.08 | 0 | 0 | 1.21 | 0 | 0 | −2.01 | −1.31 | 0 |
| 10 | 64.83 | 14.88 | 5.12 | 0 | 12.88 | 0.70 | 0 | 0.08 | 0 | 0 | 1.50 | 0 | 0 | −2.01 | −1.30 | 0 |
| 11 | 63.02 | 13.92 | 5.14 | 0 | 13.92 | 0.70 | 0 | 0.08 | 2.01 | 0 | 1.21 | 0 | 0 | 0.00 | 0.70 | 1.67 |
| 12 | 61.00 | 14.93 | 5.14 | 0 | 12.91 | 0.70 | 0 | 0.08 | 4.02 | 0 | 1.21 | 0 | 0 | −2.01 | −1.31 | 3.33 |
| 13 | 58.99 | 14.93 | 5.14 | 0 | 12.91 | 0.70 | 0 | 0.08 | 6.04 | 0 | 1.21 | 0 | 0 | −2.01 | −1.31 | 5 |
| 14 | 62.64 | 13.93 | 5.11 | 0 | 13.75 | 2 | 0 | 0.08 | 2 | 0 | 0.5 | 0 | 0 | −0.18 | 1.82 | 4 |
| 15 | 63.64 | 13.93 | 5.11 | 0 | 13.75 | 1.75 | 0 | 0.08 | 1 | 0 | 0.75 | 0 | 0 | −0.18 | 1.57 | 1.33 |
| 16 | 62.64 | 13.93 | 5.11 | 0 | 13.75 | 1.75 | 0 | 0.08 | 2 | 0 | 0.75 | 0 | 0 | −0.18 | 1.57 | 2.67 |
| 17 | 61.64 | 13.93 | 5.11 | 0 | 13.75 | 1.75 | 0 | 0.08 | 3 | 0 | 0.75 | 0 | 0 | −0.18 | 1.57 | 4 |
| 18 | 63.64 | 13.93 | 5.11 | 0 | 13.75 | 1.50 | 0 | 0.08 | 1 | 0 | 1 | 0 | 0 | −0.18 | 1.32 | 1 |
| 19 | 63.64 | 13.93 | 5.11 | 0 | 13.75 | 1.25 | 0 | 0.08 | 1 | 0 | 1.25 | 0 | 0 | −0.18 | 1.07 | 0.80 |
| 20 | 64.70 | 14.85 | 5.11 | 0 | 12.75 | 2 | 0 | 0.08 | 0 | 0 | 0.5 | 0 | 0 | −2.10 | −0.10 | 0 |
| 21 | 64.70 | 14.85 | 5.11 | 0 | 12.75 | 1.75 | 0 | 0.08 | 0 | 0 | 0.75 | 0 | 0 | −2.10 | −0.35 | 0 |
| 22 | 64.70 | 14.85 | 5.11 | 0 | 12.75 | 1.50 | 0 | 0.08 | 0 | 0 | 1.00 | 0 | 0 | −2.10 | −0.60 | 0 |
| 23 | 64.54 | 14.81 | 5.10 | 0 | 12.72 | 1.75 | 0 | 0.08 | 0 | 0 | 0.75 | 0.25 | 0 | −2.10 | −0.35 | 0 |
| 24 | 64.38 | 14.78 | 5.09 | 0 | 12.69 | 1.74 | 0 | 0.08 | 0 | 0 | 0.75 | 0.5 | 0 | −2.09 | −0.35 | 0 |
| 25 | 63.20 | 14.85 | 5.11 | 0 | 12.75 | 1.75 | 0 | 0.08 | 1.50 | 0 | 0.75 | 0 | 0 | −2.10 | −0.35 | 2 |
| 26 | 63.11 | 14.03 | 5.15 | 0 | 13.85 | 1.01 | 0 | 0.08 | 2.01 | 0 | 0.76 | 0 | 0 | −0.18 | 0.83 | 2.67 |
| 27 | 62.79 | 13.96 | 5.12 | 0 | 13.78 | 1.50 | 0 | 0.08 | 2.00 | 0 | 0.75 | 0 | 0 | −0.18 | 1.32 | 2.67 |
| 28 | 62.48 | 13.89 | 5.10 | 0 | 13.71 | 1.99 | 0 | 0.08 | 1.99 | 0 | 0.75 | 0 | 0 | −0.18 | 1.82 | 2.67 |
| 29 | 62.64 | 13.43 | 5.11 | 0 | 14.25 | 1.75 | 0 | 0.08 | 2 | 0 | 0.75 | 0 | 0 | 0.82 | 2.57 | 2.67 |
| 30 | 62.64 | 14.43 | 5.11 | 0 | 13.25 | 1.75 | 0 | 0.08 | 2 | 0 | 0.75 | 0 | 0 | −1.18 | 0.57 | 2.67 |
| 31 | 59.80 | 14.95 | 0.00 | 4.98 | 14.95 | 2.49 | 0 | 0.08 | 1.99 | 0 | 0.75 | 0 | 0 | 0.00 | 2.49 | 2.67 |
| 32 | 63.50 | 13.83 | 5.46 | 0 | 13.65 | 1.74 | 0 | 0.08 | 0.99 | 0 | 0.74 | 0 | 0 | −0.18 | 1.56 | 1.33 |
| 33 | 64.20 | 13.25 | 5.12 | 0 | 13.75 | 1.75 | 0 | 0.08 | 1.1 | 0 | 0.75 | 0 | 0 | 0.50 | 2.25 | 1.47 |
| 34 | 63.64 | 13.93 | 5.11 | 0 | 13.75 | 1.75 | 0 | 0.08 | 1 | 0 | 0.75 | 0 | 0 | −0.18 | 1.57 | 1.33 |
| 35 | 61.75 | 13.43 | 5.11 | 0 | 14.25 | 2.38 | 0 | 0.08 | 0 | 0 | 3 | 0 | 0 | 0.82 | 3.20 | 0 |
| 36 | 61.75 | 13.93 | 5.11 | 0 | 13.75 | 2.38 | 0 | 0.08 | 0 | 0 | 3 | 0 | 0 | −0.18 | 2.20 | 0 |
| 37 | 61.75 | 14.43 | 5.11 | 0 | 13.25 | 2.38 | 0 | 0.08 | 0 | 0 | 3 | 0 | 0 | −1.18 | 1.20 | 0 |
| 38 | 62.75 | 13.93 | 5.11 | 0 | 13.75 | 2.38 | 0 | 0.08 | 0 | 0 | 2 | 0 | 0 | −0.18 | 2.20 | 0 |
| 39 | 60.75 | 13.93 | 5.11 | 0 | 13.75 | 2.38 | 0 | 0.08 | 0 | 0 | 4 | 0 | 0 | −0.18 | 2.20 | 0 |
| 40 | 63.75 | 13.93 | 5.11 | 0 | 13.75 | 2.38 | 0 | 0.08 | 0 | 1 | 0 | 0 | 0 | −0.18 | 2.20 | — |
| 41 | 63.64 | 13.93 | 5.11 | 0 | 13.75 | 1.75 | 0 | 0.08 | 1 | 0 | 0.75 | 0 | 0 | −0.18 | 1.57 | 1.33 |
| 42 | 64.62 | 13.44 | 5.11 | 0 | 13.24 | 1.75 | 0 | 0.08 | 1 | 0 | 0.75 | 0 | 0 | −0.20 | 1.55 | 1.33 |
| 43 | 64.05 | 13.93 | 5.11 | 0 | 13.75 | 1.75 | 0 | 0.08 | 0.83 | 0 | 0.50 | 0 | 0 | −0.18 | 1.57 | 1.66 |
| 44 | 63.78 | 13.93 | 5.11 | 0 | 13.75 | 1.75 | 0 | 0.08 | 1 | 0 | 0.60 | 0 | 0 | −0.18 | 1.57 | 1.67 |
| 45 | 63.51 | 13.93 | 5.11 | 0 | 13.75 | 1.75 | 0 | 0.08 | 1.17 | 0 | 0.70 | 0 | 0 | −0.18 | 1.57 | 1.67 |
| 46 | 63.65 | 13.90 | 5.10 | 0 | 13.72 | 1.75 | 0 | 0.08 | 1 | 0 | 0.60 | 0 | 0.2 | −0.18 | 1.57 | 1.67 |
| 47 | 63.53 | 13.87 | 5.09 | 0 | 13.70 | 1.74 | 0 | 0.08 | 1 | 0 | 0.60 | 0 | 0.4 | −0.18 | 1.56 | 1.67 |
| 48 | 64.18 | 13.93 | 5.11 | 0 | 13.75 | 1.75 | 0 | 0.08 | 0 | 0 | 0.60 | 0 | 0.6 | −0.18 | 1.57 | 0 |

TABLE Ib

| | Glass Properties | | | | | | | | Crystalline Phase(s) | | | |
| | | | | | | | | | Heat Treated Glass | | | |
| Example | Strain Point (° C.) | Annealing Point (° C.) | Softening Point (° C.) | α (10⁻⁷/° C.) | ρ (g/cm³) | $T_{lqds}$ (° C.) | $\eta_{lqds}$ (kP) | Liquidous Phase(s) | As Made | 700° C.- 4 hr | 750° C.- 4 hr | PB Crystal Size (nm) |
|---|---|---|---|---|---|---|---|---|---|---|---|---|
| 1 | 559 | 608 | 888 | 76.1 | 2.46 | 1235 | 12.2 | Mag | Mag | Mag | Mag | |
| 2 | | | | | | | | Mag | Amorph | Amorph | Amorph | |
| 3 | | | | | | 1050 | 402 | <1050° C. | Amorph | Mag | Mag | |
| 4 | | | | | | | | Hem + Mag | Amorph | Mag | Mag | |
| 5 | | | | | | | | Hem + Mag | Mag | Mag | Mag | |
| 6 | | | | | | | | Hem + Mag | Mag | Mag + Hem | Mag + Fay | |
| 7 | | | | | | | | PB | Mag | Mag | Mag + PB | |
| 8 | | | | | | | | | Amorph | Amorph | Amorph | |
| 9 | | | | | | | | | Amorph | Mag + Hem | Mag + Hem | |
| 10 | | | | | | | | | Amorph | Mag | Mag | |
| 11 | | | | | | | | | ? | Mag + ? | Mag + PB | |
| 12 | | | | | | | | | ? | PB + ? | PB | |
| 13 | | | | | | | | | ? | PB + Rutile | PB + Rutile | |
| 14 | 566 | 617 | 900 | | 2.43 | 1110 | 116 | | Amorph | PB | PB | |
| 15 | 560 | 612 | 883 | | 2.42 | 1050 | 493 | | Amorph | Mag + PB | Hem + Mag + PB | |
| 16 | 563 | 613 | 891 | | 2.43 | 1140 | 60 | | Amorph | Mag + PB | PB | |
| 17 | 566 | 619 | 904 | | 2.45 | 1155 | <45 | | Amorph | PB | PB | |
| 18 | 556 | 607 | 880 | | 2.43 | | | | Amorph | Mag | Mag + PB | |
| 19 | 559 | 609 | 893 | | 2.43 | | | | Amorph | Mag | Mag + ? | |
| 20 | | | | | | | | | | | | |
| 21 | | | | | | | | | | | | |
| 22 | | | | | | | | | | | | |
| 23 | | | | | | | | | | | | |
| 24 | | | | | | | | | | | | |
| 25 | | | | | | | | | | | | |
| 26 | 574 | 626 | | | 2.43 | 1120 | | | PB | PB | | 18 |
| 27 | 572 | 626 | | | 2.43 | 1110 | | | trace Mag? | PB | | 17 |
| 28 | 570 | 623 | | | 2.44 | 1105 | | | PB | PB | | 17 |
| 29 | 559 | 608 | | | 2.44 | 1085 | | | PB | PB | | 20 |
| 30 | 575 | 627 | | | 2.43 | 1135 | | | PB | PB | | 15 |
| 31 | 625 | 680 | | | 2.45 | 1065 | 658 | | | | | |
| 32 | | | | | | 1045 | 470 | | | | | |
| 33 | | | | | | 1050 | | | | | | |
| 34 | | | | | | 1065 | | | | | | |
| 35 | | | | | | | | | | | | |
| 36 | | | | | | | | | | | | |
| 37 | | | | | | | | | | | | |
| 38 | | | | | | | | | | | | |
| 39 | | | | | | | | | | | | |
| 40 | | | | | | | | | | | | |
| 41 | | | | | 2.42 | 1095 | 216 | | | | | |
| 42 | | | | | 2.42 | 1070 | 422 | | | | | |
| 43 | | | | | | 1065 | | | | | | |
| 44 | | | | | | 1070 | | | | | | |
| 45 | | | | | | 1100 | | | | | | |
| 46 | | | | | | 1060 | | | | | | |
| 47 | | | | | | 1065 | | | | | | |
| 48 | | | | | | 1030 | | | | | | |

Amorph = amorphous; Fay = Fayalite; Hem = Hematite; Mag = Magnetite; & PB = Pseudobrookite TABLE II a (i)

| | | Example | | | | |
|---|---|---|---|---|---|---|
| | | 49 | 50 | 51 | 52 | 53 |
| Glass Composition Mole Percent (Mol %) | $SiO_2$ | 63.77 | 63.69 | 63.74 | 63.79 | 63.82 |
| | $Al_2O_3$ | 13.92 | 13.95 | 13.96 | 13.92 | 13.89 |
| | $B_2O_3$ | 5.12 | 5.13 | 5.12 | 5.12 | 5.10 |
| | $Na_2O$ | 13.71 | 13.73 | 13.69 | 13.66 | 13.76 |
| | $K_2O$ | 0.01 | 0.02 | 0.01 | 0.01 | 0.01 |
| | MgO | 1.92 | 1.79 | 1.75 | 1.74 | 1.74 |
| | CaO | 0.04 | 0.04 | 0.03 | 0.04 | 0.03 |
| | $SnO_2$ | 0.09 | 0.12 | 0.12 | 0.12 | 0.06 |
| | $ZrO_2$ | 0.02 | 0.02 | 0.03 | 0.03 | 0.03 |
| | $TiO_2$ | 0.98 | 0.98 | 1.00 | 0.98 | 0.98 |
| | $Fe_2O_3$ | 0.42 | 0.53 | 0.55 | 0.56 | 0.56 |

TABLE II a (i)-continued

| | Example | | | | |
|---|---|---|---|---|---|
| | 49 | 50 | 51 | 52 | 53 |
| MnO | 0 | 0 | 0.01 | 0 | 0 |
| CoO | 0 | 0 | 0 | 0 | 0 |
| $RO + R_2O - Al_2O_3$ | 1.78 | 1.64 | 1.53 | 1.53 | 1.67 |
| $R_2O - Al_2O_3$ | -0.19 | -0.20 | -0.25 | -0.25 | -0.11 |
| $TiO_2/Fe_2O_3$ | 2.34 | 1.83 | 1.80 | 1.74 | 1.73 |
| Strain Point (° C.) | | | 567 | | |
| Annealing Point (° C.) | | | 619 | | |
| Softening Point (° C.) | | | | | |
| α (10⁻⁷/° C.) | | | | | |
| ρ (g/cm³) | | | | 2.409 | 2.407 |

TABLE II a (i)-continued

| | Example | | | | |
|---|---|---|---|---|---|
| | 49 | 50 | 51 | 52 | 53 |
| Beta-OH | | | 0.405 | | |
| $T_{lqds}$ (° C.) | 1065 | | | | 1025 |
| $\eta_{lqds}$ (kP) | | | | | 967 |

TABLE II a (ii)

| | | Example | | | | |
|---|---|---|---|---|---|---|
| | | 54 | 55 | 56 | 57 | 58 |
| Glass | $SiO_2$ | 63.71 | 63.77 | 63.81 | 63.81 | 63.83 |
| Composition Mole Percent (Mol %) | $Al_2O_3$ | 13.83 | 13.96 | 13.83 | 13.69 | 13.66 |
| | $B_2O_3$ | 5.08 | 5.08 | 5.08 | 5.11 | 5.13 |
| | $Na_2O$ | 13.76 | 13.56 | 13.61 | 13.60 | 13.62 |
| | $K_2O$ | 0.02 | 0.02 | 0.01 | 0.02 | 0.02 |
| | MgO | 1.75 | 1.75 | 1.75 | 1.74 | 1.76 |
| | CaO | 0.03 | 0.04 | 0.03 | 0.03 | 0.03 |
| | $SnO_2$ | 0.05 | 0.06 | 0.05 | 0.05 | 0.05 |
| | $ZrO_2$ | 0.03 | 0.03 | 0.03 | 0.03 | 0.03 |
| | $TiO_2$ | 0.98 | 0.99 | 1.20 | 1.35 | 1.24 |
| | $Fe_2O_3$ | 0.56 | 0.57 | 0.57 | 0.56 | 0.63 |
| | MnO | 0.19 | 0.19 | 0.02 | 0.01 | 0.01 |
| | CoO | 0 | 0 | 0 | 0 | 0 |
| $RO + R_2O - Al_2O_3$ | | 1.91 | 1.59 | 1.59 | 1.71 | 1.77 |
| $R_2O - Al_2O_3$ | | -0.06 | -0.39 | -0.21 | -0.07 | -0.03 |
| $TiO_2/Fe_2O_3$ | | 1.73 | 1.74 | 2.12 | 2.41 | 1.98 |
| Strain Point (° C.) | | | | 565 | | |
| Annealing Point (° C.) | | | | 617 | | |
| Softening Point (° C.) | | | | 881.9 | | |
| $\alpha$ ($10^{-7}$/° C.) | | | | 74.1 | | |
| $\rho$ (g/cm$^3$) | | | | 2.408 | | |
| Beta-OH | | | | 0.391 | | |
| $T_{lqds}$ (° C.) | | | 1035 | | 1045 | |
| $\eta_{lqds}$ (kP) | | | 726 | | 496 | |

TABLE II a (iii)

| | | Example | | | |
|---|---|---|---|---|---|
| | | 59 | 60 | 61 | 62 |
| Glass | $SiO_2$ | 63.96 | 63.94 | 64.05 | 64.23 |
| Composition Mole Percent (Mol %) | $Al_2O_3$ | 13.61 | 13.60 | 13.60 | 13.58 |
| | $B_2O_3$ | 5.17 | 5.18 | 5.17 | 5.19 |
| | $Na_2O$ | 13.63 | 13.66 | 13.77 | 13.70 |
| | $K_2O$ | 0.01 | 0.01 | 0.01 | 0.02 |
| | MgO | 1.75 | 1.75 | 1.43 | 1.22 |
| | CaO | 0.03 | 0.03 | 0.03 | 0.03 |
| | $SnO_2$ | 0.06 | 0.06 | 0.05 | 0.05 |
| | $ZrO_2$ | 0.06 | 0.06 | 0.06 | 0.07 |
| | $TiO_2$ | 1.00 | 0.99 | 0.98 | 0.98 |
| | $Fe_2O_3$ | 0.71 | 0.71 | 0.74 | 0.75 |
| | MnO | 0.01 | 0.01 | 0.11 | 0.19 |
| | CoO | 0 | 0 | 0 | 0 |
| $RO + R_2O - Al_2O_3$ | | 1.82 | 1.87 | 1.75 | 1.58 |
| $R_2O - Al_2O_3$ | | 0.03 | 0.08 | 0.18 | 0.14 |
| $TiO_2/Fe_2O_3$ | | 1.42 | 1.40 | 1.33 | 1.30 |
| Strain Point (° C.) | | | 562 | 559 | |
| Annealing Point (° C.) | | | 613 | 611 | |
| Softening Point (° C.) | | | | | |
| $\alpha$ ($10^{-7}$/° C.) | | | | 74.7 | |
| $\rho$ (g/cm$^3$) | | | 2.353 | 2.412 | |
| Beta-OH | | | 0.373 | 0.365 | |
| $T_{lqds}$ (° C.) | | | 1035 | | 1075 |
| $\eta_{lqds}$ (kP) | | | 637 | | 224 |

TABLE IIa (iv)

| | | Example | | | |
|---|---|---|---|---|---|
| | | 63 | 64 | 65 | 66 |
| Glass | $SiO_2$ | 65.08 | 65.06 | 64.91 | 65.16 |
| Composition Mole Percent (Mol %) | $Al_2O_3$ | 13.19 | 13.13 | 13.13 | 13.31 |
| | $B_2O_3$ | 4.97 | 5.03 | 5.15 | 4.85 |
| | $Na_2O$ | 13.18 | 13.22 | 13.11 | 12.16 |
| | $K_2O$ | 0.01 | 0.01 | 0.01 | 0.95 |
| | MgO | 1.73 | 1.75 | 1.73 | 1.74 |
| | CaO | 0.03 | 0.03 | 0.03 | 0.04 |
| | $SnO_2$ | 0.03 | 0.02 | 0.02 | 0.02 |
| | $ZrO_2$ | 0.04 | 0.02 | 0.02 | 0.02 |
| | $TiO_2$ | 0.98 | 0.98 | 0.97 | 0.99 |
| | $Fe_2O_3$ | 0.75 | 0.74 | 0.63 | 0.75 |
| | MnO | 0.01 | 0.01 | 0.01 | 0.01 |
| | CoO | 0 | 0 | 0.26 | 0.01 |
| $RO + R_2O - Al_2O_3$ | | 1.77 | 1.89 | 1.77 | 1.58 |
| $R_2O - Al_2O_3$ | | 0 | 0 | 0 | -0.20 |
| $TiO_2/Fe_2O_3$ | | 1.32 | 1.32 | 1.54 | 1.32 |
| Strain Point (° C.) | | | | | |
| Annealing Point (° C.) | | | | | |
| Softening Point (° C.) | | | | | |
| $\alpha$ ($10^{-7}$/° C.) | | | | | |
| $\rho$ (g/cm$^3$) | | | | | |
| Beta-OH | | | | | |
| $T_{lqds}$ (° C.) | | | | 1050 | |
| $\eta_{lqds}$ (kP) | | | | 604 | |

TABLE II a (v)

| | | Example | | | | |
|---|---|---|---|---|---|---|
| | | 67 | 68 | 69 | 70 | 71 |
| Glass | $SiO_2$ | 65.46 | 66.00 | 65.97 | 65.96 | 66.13 |
| Composition Mole Percent (Mol %) | $Al_2O_3$ | 12.95 | 12.70 | 12.77 | 12.70 | 12.73 |
| | $B_2O_3$ | 4.50 | 3.74 | 3.68 | 3.71 | 3.69 |
| | $Na_2O$ | 13.04 | 13.60 | 13.62 | 12.79 | 13.17 |
| | $K_2O$ | 0.39 | 0.04 | 0.02 | 0.88 | 0.55 |
| | MgO | 1.54 | 1.62 | 1.41 | 1.61 | 1.63 |
| | CaO | 0.03 | 0.03 | 0.03 | 0.03 | 0.03 |
| | $SnO_2$ | 0.02 | 0.02 | 0.02 | 0.02 | 0.02 |
| | $ZrO_2$ | 0.01 | 0.01 | 0.01 | 0.01 | 0.01 |
| | $TiO_2$ | 1.30 | 1.47 | 1.49 | 1.50 | 1.32 |
| | $Fe_2O_3$ | 0.74 | 0.76 | 0.76 | 0.76 | 0.68 |
| | MnO | 0.01 | 0.01 | 0.22 | 0.03 | 0.03 |
| | CoO | 0.01 | 0.01 | 0.01 | 0.01 | 0.01 |
| $RO + R_2O - Al_2O_3$ | | 2.06 | 2.60 | 2.52 | 2.63 | 2.67 |
| $R_2O - Al_2O_3$ | | 0.48 | 0.94 | 0.87 | 0.97 | 0.99 |
| $TiO_2/Fe_2O_3$ | | 1.76 | 1.93 | 1.95 | 1.96 | 1.95 |
| Strain Point (° C.) | | | | 567 | | |
| Annealing Point (° C.) | | | | 617 | | |
| Softening Point (° C.) | | | | | | |
| $\alpha$ ($10^{-7}$/° C.) | | | | | | |
| $\rho$ (g/cm$^3$) | | | | 2.418 | | |
| Beta-OH | | | | 0.358 | | |
| $T_{lqds}$ (° C.) | | | | | | |
| $\eta_{lqds}$ (kP) | | | | | | |

TABLE II b (i)

| | | Example | | | |
|---|---|---|---|---|---|
| | 49 | 50 | 51 | 52 | 53 |
| | | XRD Results | | | |
| As Made Glass-> Heat Treated Glasses | | | | | |
| Nucleation Temperature-time $Tn\text{-}t_n$ | Growth Temperature-time $Tc\text{-}t_c$ | | | | |
| 630° C.-2 hrs | 675° C.-4 hrs | | | | |
| 630° C.-2 hrs | 700° C.-4 hrs | | | | |
| 630° C.-2 hrs | 725° C.-4 hrs | | | | Amorphous |
| 630° C.-2 hrs | 750° C.-4 hrs | | | | ε-Fe$_2$O$_3$ |
| 630° C.-2 hrs | 775° C.-4 hrs | ε-Fe$_2$O$_3$ | | | ε-Fe$_2$O$_3$ |
| 630° C.-2 hrs | 800° C.-4 hrs | ε-Fe$_2$O$_3$ | | | |

TABLE II b (i)-continued

| | | Example | | | |
|---|---|---|---|---|---|
| | 49 | 50 | 51 | 52 | 53 |
| | | Indentation Threshold (kg) | | | |
| As Made Glass-> Heat Treated Glasses | | | | | |
| $Tn\text{-}t_n$ | $Tc\text{-}t_c$ | | | | |
| 630° C.-2 hrs | 675° C.-4 hrs | | | | 37.5 |
| 630° C.-2 hrs | 700° C.-4 hrs | | | | |
| 630° C.-2 hrs | 725° C.-4 hrs | | | | |
| 630° C.-2 hrs | 750° C.-4 hrs | | | | 22.5 |
| | | Transmission Percent (%) | | | |
| As Made Glass-> Heat Treated Glasses | | | | | |
| $Tn\text{-}t_n$ | $Tc\text{-}t_c$ | | | | |
| 630° C.-2 hrs | 675° C.-4 hrs | | | 13.22 | 27.98 |
| 630° C.-2 hrs | 700° C.-4 hrs | 83.49 | 5.24 | 0.98 | 0.97 |
| 630° C.-2 hrs | 725° C.-4 hrs | | | 0.07 | na |
| 630° C.-2 hrs | 750° C.-4 hrs | | | 0.08 | 0.05 |
| 630° C.-2 hrs | 775° C.-4 hrs | 4.49 | 0.06 | | |
| 630° C.-2 hrs | 800° C.-4 hrs | na | 0.09 | | |

TABLE II b (ii)

| | | Example | | | |
|---|---|---|---|---|---|
| | 54 | 55 | 56 | 57 | 58 |
| | | XRD Results | | | |
| As Made Glass-> Heat Treated Glasses | | | | | |
| Nucleation Temperature-time $Tn\text{-}t_n$ | Growth Temperature-time $Tc\text{-}t_c$ | | | | |
| 630° C.-2 hrs | 675° C.-4 hrs | | | | |
| 630° C.-2 hrs | 700° C.-4 hrs | | | | |
| 630° C.-2 hrs | 725° C.-4 hrs | | | | |
| 630° C.-2 hrs | 750° C.-4 hrs | ε-Fe$_2$O$_3$ | | Pseudo-brookite | ε-Fe$_2$O$_3$ |
| 630° C.-2 hrs | 775° C.-4 hrs | ↑ε-Fe$_2$O$_3$ | | Pseudo-brookite | |
| 630° C.-2 hrs | 800° C.-4 hrs | | | | |
| | | Indentation Threshold (kg) | | | |
| As Made Glass-> Heat Treated Glasses | | | | | |
| $Tn\text{-}t_n$ | $Tc\text{-}t_c$ | | | | |
| 630° C.-2 hrs | 675° C.-4 hrs | | | | |
| 630° C.-2 hrs | 700° C.-4 hrs | | | | |
| 630° C.-2 hrs | 725° C.-4 hrs | | | | |
| 630° C.-2 hrs | 750° C.-4 hrs | | | | |
| | | Transmission Percent (%) | | | |
| As Made Glass-> Heat Treated Glasses | | | | | |
| $Tn\text{-}t_n$ | $Tc\text{-}t_c$ | | | | |
| 630° C.-2 hrs | 675° C.-4 hrs | 3.71 | | 0.06 | 0.07 | 0.08 |
| 630° C.-2 hrs | 700° C.-4 hrs | 0.08 | 0.16 | 0.06 | 0.08 | 0.06 |
| 630° C.-2 hrs | 725° C.-4 hrs | 0.09 | | 0.08 | 0.11 | 0.09 |

TABLE II b (ii)-continued

| | | Example | | | | |
|---|---|---|---|---|---|---|
| | | 54 | 55 | 56 | 57 | 58 |
| 630° C.-2 hrs | 750° C.-4 hrs | 0.04 | 0.04 | 0.15 | 0.63 | 0.08 |
| 630° C.-2 hrs | 775° C.-4 hrs | | 0.13 | | 0.95 | |
| 630° C.-2 hrs | 800° C.-4 hrs | | | | | |

TABLE IIb (iii)

| | | Example | | | |
|---|---|---|---|---|---|
| | | 59 | 60 | 61 | 62 |

As Made Glass
Heat Treated Glasses

| Nucleation Temperature-time $Tn$-$t_n$ | Growth Temperature-time $Tc$-$t_c$ | XRD Results | | | |
|---|---|---|---|---|---|
| 630° C.-2 hrs | 675° C.-4 hrs | | | | |
| 630° C.-2 hrs | 700° C.-4 hrs | | | | $\epsilon$-$Fe_2O_3$? |
| 630° C.-2 hrs | 725° C.-4 hrs | $\epsilon$-$Fe_2O_3$ | Trace Magnetite? | | |
| 630° C.-2 hrs | 750° C.-4 hrs | $\epsilon$-$Fe_2O_3$ | $\epsilon$-$Fe_2O_3$ | | $\epsilon$-$Fe_2O_3$-d-spacing |
| 630° C.-2 hrs | 775° C.-4 hrs | ↑$\epsilon$-$Fe_2O_3$ | | | $\epsilon$-$Fe_2O_3$-d-spacing |
| 630° C.-2 hrs | 800° C.-4 hrs | | | | |

As Made Glass
Heat Treated Glasses

| $Tn$-$t_n$ | $Tc$-$t_c$ | Indentation Threshold (kg) | | | |
|---|---|---|---|---|---|
| 630° C.-2 hrs | 675° C.-4 hrs | | | | |
| 630° C.-2 hrs | 700° C.-4 hrs | | | | |
| 630° C.-2 hrs | 725° C.-4 hrs | | | | |
| 630° C.-2 hrs | 750° C.-4 hrs | | | | |

As Made Glass
Heat Treated Glasses

| $Tn$-$t_n$ | $Tc$-$t_c$ | Transmission Percent (%) | | | |
|---|---|---|---|---|---|
| 630° C.-2 hrs | 675° C.-4 hrs | 0.06 | | | |
| 630° C.-2 hrs | 700° C.-4 hrs | 0.07 | 0.86 | 0.08 | 0.03 |
| 630° C.-2 hrs | 725° C.-4 hrs | 0.05 | 0.03 | 0.07 | 0.04 |
| 630° C.-2 hrs | 750° C.-4 hrs | 0.07 | 0.02 | 0.07 | 0.03 |
| 630° C.-2 hrs | 775° C.-4 hrs | | 0.03 | | 0.05 |
| 630° C.-2 hrs | 800° C.-4 hrs | | | | |

TABLE IIb (iv)

| | | Example | | | |
|---|---|---|---|---|---|
| | | 63 | 64 | 65 | 66 |

As Made Glass
Heat Treated Glasses

| Nucleation Temperature-time $Tn$-$t_n$ | Growth Temperature-time $Tc$-$t_c$ | XRD Results | | | |
|---|---|---|---|---|---|
| 630° C.-2 hrs | 675° C.-4 hrs | | | | |
| 630° C.-2 hrs | 700° C.-4 hrs | $\epsilon$-$Fe_2O_3$ | | | |
| 630° C.-2 hrs | 725° C.-4 hrs | | | | |
| 630° C.-2 hrs | 750° C.-4 hrs | $\epsilon$-$Fe_2O_3$ | | | |
| 630° C.-2 hrs | 775° C.-4 hrs | $\epsilon$-$Fe_2O_3$ | | | |
| 630° C.-2 hrs | 800° C.-4 hrs | | | | |

TABLE IIb (iv)-continued

| | | Example | | | |
|---|---|---|---|---|---|
| | | 63 | 64 | 65 | 66 |

As Made Glass
Heat Treated Glasses

| $Tn$-$t_n$ | $Tc$-$t_c$ | Indentation Threshold (kg) | | | |
|---|---|---|---|---|---|
| 630° C.-2 hrs | 675° C.-4 hrs | | | | |
| 630° C.-2 hrs | 700° C.-4 hrs | | | | |
| 630° C.-2 hrs | 725° C.-4 hrs | | | | |
| 630° C.-2 hrs | 750° C.-4 hrs | | | | |

As Made Glass
Heat Treated Glasses

| $Tn$-$t_n$ | $Tc$-$t_c$ | Transmission Percent (%) | | | |
|---|---|---|---|---|---|
| 630° C.-2 hrs | 675° C.-4 hrs | | 0.09 | 0.04 | |
| 630° C.-2 hrs | 700° C.-4 hrs | | 0.09 | 0.03 | |
| 630° C.-2 hrs | 725° C.-4 hrs | 0.03 | 0.02 | 0.03 | 0.05 |

TABLE IIb (iv)-continued

| | | Example | | | |
|---|---|---|---|---|---|
| | | 63 | 64 | 65 | 66 |
| 630° C.-2 hrs | 750° C.-4 hrs | | 0.03 | 0.02 | 0.03 |
| 630° C.-2 hrs | 775° C.-4 hrs | | 0.03 | 0.02 | 0.05 |
| 630° C.-2 hrs | 800° C.-4 hrs | | | | |

TABLE II b (v)

| | | Example | | | | |
|---|---|---|---|---|---|---|
| | | 67 | 68 | 69 | 70 | 71 |
| | | XRD Results | | | | |
| As Made Glass–> Heat Treated Glasses | | | | | | |
| Nucleation Temperature-time $T_n$-$t_n$ | Growth Temperature-time $T_c$-$t_c$ | | | | | |
| 630° C.-2 hrs | 675° C.-4 hrs | | | | | |
| 630° C.-2 hrs | 700° C.-4 hrs | | | | | |
| 630° C.-2 hrs | 725° C.-4 hrs | | | | | |
| 630° C.-2 hrs | 750° C.-4 hrs | Pseudo-brookite | | | | |
| 630° C.-2 hrs | 775° C.-4 hrs | Pseudo-brookite | | | | |
| 630° C.-2 hrs | 800° C.-4 hrs | | | | | |
| | | Indentation Threshold (kg) | | | | |
| As Made Glass–> Heat Treated Glasses | | | | | | |
| $T_n$-$t_n$ | $T_c$-$t_c$ | | | | | |
| 630° C.-2 hrs | 675° C.-4 hrs | | | | | |
| 630° C.-2 hrs | 700° C.-4 hrs | | | | | |
| 630° C.-2 hrs | 725° C.-4 hrs | | | | | |
| 630° C.-2 hrs | 750° C.-4 hrs | | | | | |
| | | Transmission Percent (%) | | | | |
| As Made Glass–> Heat Treated Glasses | | | | | | |
| $T_n$-$t_n$ | $T_c$-$t_c$ | | | | | |
| 630° C.-2 hrs | 675° C.-4 hrs | 0.02 | 0.05 | 0.02 | 0.03 | 0.02 |
| 630° C.-2 hrs | 700° C.-4 hrs | 0.02 | 0.03 | 0.02 | 0.03 | 0.02 |
| 630° C.-2 hrs | 725° C.-4 hrs | 0.02 | 0.02 | 0.03 | 0.03 | 0.03 |
| 630° C.-2 hrs | 750° C.-4 hrs | 0.03 | 0.03 | 0.04 | 0.04 | 0.04 |
| 630° C.-2 hrs | 775° C.-4 hrs | 0.92 | 1.35 | 0.4 | 0.97 | 0.25 |
| 630° C.-2 hrs | 800° C.-4 hrs | | | | | |

TABLE II c (i)

| | | Example | | | | |
|---|---|---|---|---|---|---|
| | | 49 | 50 | 51 | 52 | 53 |
| | | CIE L* D65 SCE Results | | | | |
| As made Glass–> Heat Treated Glasses | | | | | | |
| $T_n$-$t_n$ | $T_c$-$t_c$ | | | | | |
| 630° C.-2 hrs | 675° C.-4 hrs | | | | 0.54 | 2.78 |
| 630° C.-2 hrs | 700° C.-4 hrs | 64.69 | 0.31 | | 0.28 | 0.25 |
| 630° C.-2 hrs | 725° C.-4 hrs | | | | 0.93 | 0.6 |

TABLE II c (i)-continued

| | | Example | | | | |
|---|---|---|---|---|---|---|
| | | 49 | 50 | 51 | 52 | 53 |
| 630° C.-2 hrs | 750° C.-4 hrs | | | | 3.2 | 5.67 |
| 630° C.-2 hrs | 775° C.-4 hrs | 17.085 | 4.345 | | | 10.21 |
| 630° C.-2 hrs | 800° C.-4 hrs | 26.76 | 13.425 | | | |
| | | CIE a* D65 SCE Results | | | | |
| As Made Glass–> Heat Treated Glasses | | | | | | |
| $T_n$-$t_n$ | $T_c$-$t_c$ | | | | | |
| 630° C.-2 hrs | 675° C.-4 hrs | | | | 0.62 | 7.09 |
| 630° C.-2 hrs | 700° C.-4 hrs | 2.6 | 0.24 | | 0.05 | 0.03 |
| 630° C.-2 hrs | 725° C.-4 hrs | | | | −0.1 | 0.08 |
| 630° C.-2 hrs | 750° C.-4 hrs | | | | −0.3 | −0.135 |
| 630° C.-2 hrs | 775° C.-4 hrs | −1.15 | −0.12 | | | −0.54 |
| 630° C.-2 hrs | 800° C.-4 hrs | −1.29 | −0.705 | | | |
| | | CIE b* D65 SCE Results | | | | |
| As Made Glass–> Heat Treated Glasses | | | | | | |
| $T_n$-$t_n$ | $T_c$-$t_c$ | | | | | |
| 630° C.-2 hrs | 675° C.-4 hrs | | | | −0.14 | 3.59 |
| 630° C.-2 hrs | 700° C.-4 hrs | 28.68 | −0.36 | | −0.31 | −0.35 |
| 630° C.-2 hrs | 725° C.-4 hrs | | | | −1.46 | −0.95 |
| 630° C.-2 hrs | 750° C.-4 hrs | | | | −3.75 | −4.89 |
| 630° C.-2 hrs | 775° C.-4 hrs | −6.265 | −5.085 | | | −6.06 |
| 630° C.-2 hrs | 800° C.-4 hrs | −2.82 | −6.28 | | | |

TABLE II c (ii)

| | | Example | | | | |
|---|---|---|---|---|---|---|
| | | 54 | 55 | 56 | 57 | 58 |
| | | CIE L* D65 SCE Results | | | | |
| As Made Glass–> Heat Treated Glass | | | | | | |
| $T_n$-$t_n$ | $T_c$-$t_c$ | | | | | |
| 630° C.-2 hrs | 675° C.-4 hrs | 0.39 | | 0.26 | 0.19 | 0.41 |
| 630° C.-2 hrs | 700° C.-4 hrs | 0.345 | | 0.27 | 0.27 | 0.2 |
| 630° C.-2 hrs | 725° C.-4 hrs | 1.14 | | 0.29 | 0.22 | 0.19 |
| 630° C.-2 hrs | 750° C.-4 hrs | 2.08 | | 0.29 | 0.34 | 0.35 |
| 630° C.-2 hrs | 775° C.-4 hrs | | 0.99 | | 1.28 | |
| 630° C.-2 hrs | 800° C.-4 hrs | | | | | |
| | | CIE a* D65 SCE Results | | | | |
| As Made Glass–> Heat Treated Glasses | | | | | | |
| $T_n$-$t_n$ | $T_c$-$t_c$ | | | | | |
| 630° C.-2 hrs | 675° C.-4 hrs | −0.03 | | 0.03 | 0.01 | 0.04 |
| 630° C.-2 hrs | 700° C.-4 hrs | 0.005 | | −0.08 | 0 | −0.01 |
| 630° C.-2 hrs | 725° C.-4 hrs | −0.12 | | −0.15 | −0.04 | 0.04 |
| 630° C.-2 hrs | 750° C.-4 hrs | −0.21 | | 0.07 | −0.06 | −0.06 |
| 630° C.-2 hrs | 775° C.-4 hrs | | −0.09 | | −0.09 | |
| 630° C.-2 hrs | 800° C.-4 hrs | | | | | |

TABLE II c (ii)-continued

| | | Example | | | | |
|---|---|---|---|---|---|---|
| | | 54 | 55 | 56 | 57 | 58 |
| | | CIE b* D65 SCE Results | | | | |
| As Made Glass-> Heat Treated Glasses | | | | | | |
| $T_n$-$t_n$ | $T_c$-$t_c$ | | | | | |
| 630° C.-2 hrs | 675° C.-4 hrs | −0.48 | | −0.41 | −0.25 | −0.53 |
| 630° C.-2 hrs | 700° C.-4 hrs | −0.74 | | −0.34 | −0.36 | −0.26 |
| 630° C.-2 hrs | 725° C.-4 hrs | −1.62 | | −0.36 | −0.29 | −0.3 |
| 630° C.-2 hrs | 750° C.-4 hrs | −2.53 | | −0.41 | −0.55 | −0.44 |
| 630° C.-2 hrs | 775° C.-4 hrs | | −1.25 | | −1.89 | |
| 630° C.-2 hrs | 800° C.-4 hrs | | | | | |

TABLE IIc (iii)

| | | Example | | | |
|---|---|---|---|---|---|
| | | 59 | 60 | 61 | 62 |
| As Made Glass Heat Treated Glasses | | | | | |
| $T_n$-$t_n$ | $T_c$-$t_c$ | CIE L* D65 SCE Results | | | |
| 630° C.-2 hrs | 675° C.-4 hrs | 0.24 | | | |
| 630° C.-2 hrs | 700° C.-4 hrs | 0.17 | 0.45 | 0.33 | 0.18 |
| 630° C.-2 hrs | 725° C.-4 hrs | 0.5 | 0.23 | 0.26 | 0.2 |
| 630° C.-2 hrs | 750° C.-4 hrs | 0.7 | 1.37 | 0.77 | 0.45 |
| 630° C.-2 hrs | 775° C.-4 hrs | | 1.09 | | 0.56 |
| 630° C.-2 hrs | 800° C.-4 hrs | | | | |
| As Made Glass Heat Treated Glasses | | | | | |
| $T_n$-$t_n$ | $T_c$-$t_c$ | CIE a* D65 SCE Results | | | |
| 630° C.-2 hrs | 675° C.-4 hrs | −0.01 | | | |
| 630° C.-2 hrs | 700° C.-4 hrs | 0.02 | 0.11 | 0.02 | −0.05 |
| 630° C.-2 hrs | 725° C.-4 hrs | −0.01 | 0.03 | −0.01 | 0.065 |
| 630° C.-2 hrs | 750° C.-4 hrs | −0.05 | 0.15 | −0.07 | 0.02 |
| 630° C.-2 hrs | 775° C.-4 hrs | | 0.07 | | −0.05 |
| 630° C.-2 hrs | 800° C.-4 hrs | | | | |
| As Made Glass Heat Treated Glasses | | | | | |
| $T_n$-$t_n$ | $T_c$-$t_c$ | CIE b* D65 SCE Results | | | |
| 630° C.-2 hrs | 675° C.-4 hrs | −0.42 | | | |
| 630° C.-2 hrs | 700° C.-4 hrs | −0.28 | −0.43 | −0.39 | −0.27 |
| 630° C.-2 hrs | 725° C.-4 hrs | −0.91 | −0.33 | −0.4 | −0.295 |
| 630° C.-2 hrs | 750° C.-4 hrs | −1.06 | −0.25 | −0.9 | −0.26 |
| 630° C.-2 hrs | 775° C.-4 hrs | | −1.29 | | −0.74 |
| 630° C.-2 hrs | 800° C.-4 hrs | | | | |

TABLE IIc (Iv)

| | | Example | | | |
|---|---|---|---|---|---|
| | | 63 | 64 | 65 | 66 |
| As Made Glass Heat Treated Glasses | | | | | |
| $T_n$-$t_n$ | $T_c$-$t_c$ | CIE L* D65 SCE Results | | | |
| 630° C.-2 hrs | 675° C.-4 hrs | | 0.29 | | |
| 630° C.-2 hrs | 700° C.-4 hrs | | 0.5 | 0.19 | |
| 630° C.-2 hrs | 725° C.-4 hrs | 0.12 | 0.37 | 0.29 | 0.45 |
| 630° C.-2 hrs | 750° C.-4 hrs | | 0.3 | 0.25 | 0.31 |
| 630° C.-2 hrs | 775° C.-4 hrs | | 0.72 | 0.48 | 0.43 |
| 630° C.-2 hrs | 800° C.-4 hrs | | | | |
| As Made Glass Heat Treated Glasses | | | | | |
| $T_n$-$t_n$ | $T_c$-$t_c$ | CIE a* D65 SCE Results | | | |
| 630° C.-2 hrs | 675° C.-4 hrs | | −0.08 | | |
| 630° C.-2 hrs | 700° C.-4 hrs | | −0.11 | 0.04 | |
| 630° C.-2 hrs | 725° C.-4 hrs | 0.03 | −0.06 | 0.01 | 0.04 |
| 630° C.-2 hrs | 750° C.-4 hrs | | −0.05 | −0.06 | −0.07 |
| 630° C.-2 hrs | 775° C.-4 hrs | | −0.08 | −0.04 | −0.01 |
| 630° C.-2 hrs | 800° C.-4 hrs | | | | |
| As Made Glass Heat Treated Glasses | | | | | |
| $T_n$-$t_n$ | $T_c$-$t_c$ | CIE b* D65 SCE Results | | | |
| 630° C.-2 hrs | 675° C.-4 hrs | | −0.37 | | |
| 630° C.-2 hrs | 700° C.-4 hrs | | −0.45 | −0.4 | |
| 630° C.-2 hrs | 725° C.-4 hrs | −0.19 | −0.61 | −0.31 | −0.41 |
| 630° C.-2 hrs | 750° C.-4 hrs | | −0.5 | −0.35 | −0.25 |
| 630° C.-2 hrs | 775° C.-4 hrs | | −1.03 | −0.76 | −0.74 |
| 630° C.-2 hrs | 800° C.-4 hrs | | | | |

TABLE IIIa

| Example | Glass Composition Mole Percent (Mol %) | | | | | | |
|---|---|---|---|---|---|---|---|
| | $SiO_2$ | $Al_2O_3$ | $P_2O_5$ | $Na_2O$ | $K_2O$ | MgO | CaO |
| 72 | 60.15 | 14.98 | 5 | 14.98 | 0 | 2.49 | 0.06 |
| 73 | 60.64 | 14.98 | 5 | 14.99 | 0 | 2.49 | 0.06 |
| 74 | 60.89 | 14.99 | 4.99 | 14.98 | 0 | 2.51 | 0.06 |
| 75 | 61.14 | 14.98 | 5 | 14.98 | 0 | 2.51 | 0.06 |
| 76 | 60.42 | 14.98 | 4.99 | 14.98 | 0 | 2.49 | 0.06 |
| 77 | 59.42 | 14.98 | 4.99 | 14.98 | 0 | 2.50 | 0.06 |
| 78 | 60.30 | 15.02 | 5.01 | 15.01 | 0 | 2.50 | 0.06 |
| 79 | 60.23 | 15.01 | 5 | 15.00 | 0 | 2.51 | 0.06 |
| 80 | 60.00 | 14.95 | 4.98 | 14.95 | 0 | 2.48 | 0.06 |
| 81 | 60.30 | 15.02 | 5.01 | 15.03 | 0 | 2.01 | 0.05 |
| 82 | 60.91 | 15.18 | 5.06 | 15.18 | 0 | 1.02 | 0.05 |
| 83 | 60.37 | 14.99 | 5 | 14.99 | 0 | 2.49 | 0.06 |
| 84 | 57.08 | 15.56 | 7.55 | 15.09 | 0.47 | 0.38 | 3.78 |
| 85 | 56.02 | 15.27 | 9.26 | 14.82 | 0.47 | 0.37 | 3.71 |
| 86 | 55.01 | 15.00 | 10.91 | 14.55 | 0.46 | 0.36 | 3.64 |
| 87 | 56.02 | 15.28 | 11.11 | 14.81 | 0.46 | 0.38 | 1.85 |
| 88 | 56.02 | 15.28 | 7.41 | 14.83 | 0.47 | 0.36 | 3.71 |
| 89 | 55.02 | 15.00 | 7.28 | 14.54 | 0.45 | 0.36 | 3.63 |
| 90 | 57.07 | 15.57 | 8.49 | 15.11 | 0.47 | 0.38 | 2.83 |
| 91 | 57.08 | 15.57 | 8.49 | 15.11 | 0.47 | 0.37 | 0.00 |
| 92 | 57.09 | 15.57 | 8.49 | 15.09 | 0.47 | 0.37 | 0.00 |
| 93 | 57.08 | 15.57 | 8.49 | 15.10 | 0.47 | 0.38 | 0.00 |
| 94 | 57.07 | 15.57 | 8.49 | 15.10 | 0.48 | 0.38 | 0.00 |
| 95 | 57.10 | 15.57 | 8.49 | 15.09 | 0.47 | 0.38 | 0.00 |
| 98 | 56.02 | 15.27 | 5.56 | 14.83 | 0.47 | 0.38 | 3.70 |
| 97 | 55.02 | 15.00 | 7.28 | 14.54 | 0.45 | 0.36 | 3.63 |
| 98 | 54.03 | 14.74 | 8.93 | 14.29 | 0.44 | 0.35 | 3.57 |
| 99 | 56.04 | 15.28 | 7.41 | 14.81 | 0.46 | 0.37 | 1.85 |
| 100 | 55.00 | 14.55 | 7.27 | 15.00 | 0.46 | 0.36 | 3.64 |
| 101 | 55.01 | 15.46 | 7.27 | 14.09 | 0.45 | 0.36 | 3.64 |
| 102 | 59.91 | 16.34 | 5.94 | 15.84 | 0.50 | 0.39 | 0.99 |
| 103 | 59.33 | 16.18 | 5.88 | 15.69 | 0.49 | 0.39 | 1.97 |
| 104 | 58.17 | 15.87 | 5.77 | 15.39 | 0.48 | 0.37 | 3.85 |
| 105 | 58.18 | 15.87 | 7.69 | 15.39 | 0.48 | 0.38 | 1.92 |
| 106 | 59.32 | 15.69 | 5.89 | 16.18 | 0.49 | 0.39 | 1.96 |
| 107 | 59.32 | 16.67 | 5.88 | 15.21 | 0.49 | 0.39 | 1.96 |

TABLE IIIa-continued

| Example | SrO | BaO | ZnO | La$_2$O$_3$ | Ta$_2$O$_5$ | SnO$_2$ | TiO$_2$ | Fe$_2$O$_3$ |
|---|---|---|---|---|---|---|---|---|
| 72 | 0 | 0 | 0 | 0 | 0 | 0.08 | 1.50 | 0.75 |
| 73 | 0 | 0 | 0 | 0 | 0 | 0.08 | 1 | 0.75 |
| 74 | 0 | 0 | 0 | 0 | 0 | 0.08 | 0.75 | 0.75 |
| 75 | 0 | 0 | 0 | 0 | 0 | 0.08 | 0.5 | 0.75 |
| 76 | 0 | 0 | 0 | 0 | 0 | 0.08 | 2 | 0.00 |
| 77 | 0 | 0 | 0 | 0 | 0 | 0.08 | 3 | 0.00 |
| 78 | 0 | 0 | 0 | 0 | 0 | 0.08 | 1.50 | 0.50 |
| 79 | 0 | 0 | 0 | 0 | 0 | 0.08 | 1.51 | 0.60 |
| 80 | 0 | 0 | 0 | 0 | 0 | 0.08 | 1.50 | 1.00 |
| 81 | 0 | 0 | 0 | 0 | 0 | 0.08 | 1.50 | 1.00 |
| 82 | 0 | 0 | 0 | 0 | 0 | 0.08 | 1.51 | 1.01 |
| 83 | 0 | 0 | 0 | 0 | 0 | 0.08 | 0 | 2 |
| 84 | 0 | 0 | 0 | 0 | 0 | 0.08 | 0 | 0 |
| 85 | 0 | 0 | 0 | 0 | 0 | 0.07 | 0 | 0 |
| 86 | 0 | 0 | 0 | 0 | 0 | 0.08 | 0 | 0 |
| 87 | 0 | 0 | 0 | 0 | 0 | 0.08 | 0 | 0 |
| 88 | 0 | 0 | 0 | 0 | 0 | 0.07 | 1.85 | 0 |
| 89 | 0 | 0 | 0 | 0 | 0 | 0.07 | 3.63 | 0 |
| 90 | 0 | 0 | 0 | 0 | 0 | 0.07 | 0 | 0 |
| 91 | 0 | 0 | 2.83 | 0 | 0 | 0.07 | 0 | 0 |
| 92 | 2.83 | 0 | 0 | 0 | 0 | 0.07 | 0 | 0 |
| 93 | 0 | 2.83 | 0 | 0 | 0 | 0.08 | 0 | 0 |
| 94 | 0 | 0 | 0 | 2.83 | 0 | 0.08 | 0 | 0 |
| 95 | 0 | 0 | 0 | 0 | 2.83 | 0.07 | 0 | 0 |
| 96 | 0 | 0 | 0 | 0 | 0 | 0.08 | 3.71 | 0 |
| 97 | 0 | 0 | 0 | 0 | 0 | 0.07 | 3.63 | 0 |
| 98 | 0 | 0 | 0 | 0 | 0 | 0.07 | 3.57 | 0 |
| 99 | 0 | 0 | 0 | 0 | 0 | 0.07 | 3.70 | 0 |
| 100 | 0 | 0 | 0 | 0 | 0 | 0.07 | 3.63 | 0 |
| 101 | 0 | 0 | 0 | 0 | 0 | 0.07 | 3.63 | 0 |
| 102 | 0 | 0 | 0 | 0 | 0 | 0.08 | 0 | 0 |
| 103 | 0 | 0 | 0 | 0 | 0 | 0.08 | 0 | 0 |
| 104 | 0 | 0 | 0 | 0 | 0 | 0.08 | 0 | 0 |
| 105 | 0 | 0 | 0 | 0 | 0 | 0.08 | 0 | 0 |
| 106 | 0 | 0 | 0 | 0 | 0 | 0.08 | 0 | 0 |
| 107 | 0 | 0 | 0 | 0 | 0 | 0.08 | 0 | 0 |

TABLE IIIb

| Example | R$_2$O—Al$_2$O$_3$ | R$_2$O + RO—Al$_2$O$_3$ | TiO$_2$/Fe$_2$O$_3$ | Annealing Point (° C.) | ρ (g/cm$^3$) | T$_{lqds}$ (° C.) |
|---|---|---|---|---|---|---|
| 72 | 0 | 2.56 | 2 | 700 | | 1075 |
| 73 | 0.01 | 2.57 | 1.33 | 700 | | |
| 74 | 0 | 2.57 | 1 | 700 | | |
| 75 | 0 | 2.57 | 0.67 | 700 | | |
| 76 | 0 | 2.55 | — | 700 | | |
| 77 | 0 | 2.56 | — | 700 | | |
| 78 | −0.01 | 2.56 | 2.99 | 680 | | |
| 79 | −0.01 | 2.56 | 2.50 | 680 | | |
| 80 | 0 | 2.55 | 1.50 | 680 | | |
| 81 | 0 | 2.07 | 1.50 | 680 | | 1080 |
| 82 | 0 | 1.08 | 1.50 | 680 | | 1090 |
| 83 | 0 | 2.56 | 0 | 680 | | |
| 84 | 0.01 | 4.16 | 0 | 680 | | |
| 85 | 0.01 | 4.09 | 0 | 680 | | |
| 86 | 0.01 | 4.00 | 0 | 680 | | |
| 87 | 0 | 2.23 | 0 | 680 | | |
| 88 | 0.01 | 4.08 | — | 680 | 2.45 | |
| 89 | −0.01 | 3.99 | — | 680 | 2.46 | |
| 90 | 0.01 | 3.23 | — | 680 | | |
| 91 | 0.01 | 3.21 | — | 680 | | |
| 92 | −0.01 | 3.19 | — | 680 | | |
| 93 | 0 | 3.22 | — | 680 | | |
| 94 | 0.01 | 0.39 | — | 680 | | |
| 95 | −0.01 | 0.37 | — | 680 | | |
| 96 | 0.02 | 4.09 | — | 680 | | |
| 97 | −0.01 | 3.99 | — | 680 | | |
| 98 | 0 | 3.92 | — | 680 | | |
| 99 | −0.01 | 2.21 | — | 680 | | |
| 100 | 0.91 | 4.91 | — | 680 | | |
| 101 | −0.92 | 3.09 | — | 680 | | |
| 102 | 0 | 1.38 | — | 680 | | |
| 103 | 0 | 2.36 | — | 680 | | |
| 104 | 0 | 4.24 | — | 680 | | |
| 105 | 0 | 2.31 | — | 680 | | |
| 106 | 0.98 | 3.33 | — | 680 | | |
| 107 | −0.97 | 1.38 | — | 680 | | |

TABLE IIIc

Heat Treated Glass: Color and Phases Detected at Peak Ceram Temperature Determine Using XRD

| Example | Color 850° C.-4 hr | XRD 750° C.-4 hr | XRD 780° C.-4 hr | XRD 800° C.-4 hr | XRD 850° C.-4 hr |
|---|---|---|---|---|---|
| 72 | Brown | | | | Rutile, Pseudobrookite, Hematite |
| 73 | Khaki Grey translucent | | | | Cassiterite |
| 74 | Amber translucent | | | | Amorphous |
| 75 | Amber translucent | | | | Amorphous |
| 76 | White GC | | | | Anatase |
| 77 | Bluish White GC | | | | Anatase, Rutie |
| 78 | Khaki Grey translucent | | Trace Berlinite, Magnetite | Trace Rutile | Rutile |
| 79 | Khaki Grey translucent | | Trace Berlinite, Magnetite | Rutile | Rutile |
| 80 | Black Opaque | | Pseudobrookite, Berlinite, Magnetite | Pseudobrookite, Rutile | Pseudobrookite, Rutile |
| 81 | Black Opaque | | Pseudobrookite, Berlinite, Magnetite | Pseudobrookite, Rutile | Pseudobrookite, Rutile |
| 82 | Black Opaque | | Pseudobrookite, Berlinite, Magnetite | Pseudobrookite, Rutile | Pseudobrookite, Rutile |
| 83 | Black Opaque | | Magnetite or Magnesioferrite | Magnetite or Magnesioferrite | Magnetite or Magnesioferrite |
| 84 | White Light Opal | | | | |
| 85 | White Opal | Amorphous | | Na2Ca3Al2(PO4)2(SiO4)2 | Na2Ca3Al2(PO4)2(SiO4)3 |
| 86 | White Opal | | | | |
| 87 | Clear Glass | Amorphous | Amorphous | Amorphous | Amorphous |
| 88 | Bluish White Opal | Amorphous | | Anatase, Calcium Silicate | Anatase Whitlockite |
| 89 | White GC | Amorphous | | Rutile, Anatase, Na2Ca3Al2(PO4)2(SiO4)2, Na3CaAl(P2O7)2 | Ca(PO3)2 |
| 90 | White Opal | | | | |
| 91 | Clear Glass | | | | |
| 92 | White Opal | | | | |
| 93 | Clear Glass | | | | |
| 94 | Spontaneous Ceramic | | | | |

TABLE IIIc-continued

Heat Treated Glass: Color and Phases Detected at Peak Ceram Temperature Determine Using XRD

| Example | Color 850° C.-4 hr | XRD 750° C.-4 hr | XRD 780° C.-4 hr | XRD 800° C.-4 hr | XRD 850° C.-4 hr |
|---|---|---|---|---|---|
| 95 | Clear Glass | | | | |
| 96 | Bluish White Light Opal | | | | |
| 97 | White GC | | | | |
| 98 | Cream Opal | | | | |
| 99 | White GC | | | | |
| 100 | White GC | | | | |
| 101 | White Opal | | | | |
| 102 | | | | | |
| 103 | | | | | |
| 104 | | | | | |
| 105 | | | | | |
| 106 | | | | | |
| 107 | | | | | |

TABLE IV

| | | Example | | | | | |
|---|---|---|---|---|---|---|---|
| | | 108 | 109 | 110 | 111 | 112 | 113 |
| Glass Composition Mole Percent (Mol %) | $SiO_2$ | 65 | 65 | 65 | 65 | 65 | 65 |
| | $Al_2O_3$ | 13.2 | 13.2 | 13.2 | 13.2 | 13.2 | 13.2 |
| | $B_2O_3$ | 5 | 5 | 5 | 5 | 5 | 5 |
| | $Na_2O$ | 13.3 | 13.2 | 12.3 | 8.3 | 8.3 | 13.3 |
| | MgO | 1.75 | 1.75 | 1.75 | 1.75 | 1.75 | 2.5 |
| | $TiO_2$ | 1 | 1 | 1 | 1 | 1 | 0 |
| | $Fe_2O_3$ | 0.75 | 0.75 | 0.75 | 0.75 | 0.75 | 0 |
| | CuO | 0 | 0.2 | 2 | 10 | 0 | 0.2 |
| | $Cu_2O$ | 0 | 0 | 0 | 0 | 5 | 0 |
| | Total | 100 | 100 | 101 | 105 | 100 | 99 |
| $RO + R_2O - Al_2O_3$ | | 1.85 | 1.95 | 2.85 | 6.85 | 1.85 | 2.8 |
| $R_2O - Al_2O_3$ | | 0.1 | 0 | -0.9 | -4.9 | 0.1 | 0.1 |
| $TiO_2/Fe_2O_3$ | | 1.33 | 1.33 | 1.33 | 1.33 | 1.33 | |

TABLE V

| Example | Heat treat | IOX Temp | IOX Time (hrs) | thk (mm) | CS (MPa) | DOL (um) |
|---|---|---|---|---|---|---|
| 53 | 630-2 | 430 | 14 | 0.75 | 949.3 | 50.9 |
| 57 | 630-2 | 430 | 14 | 0.76 | 957.9 | 49.8 |
| 59 | 630-2 | 430 | 14 | 0.76 | 941.3 | 49.8 |
| — | 630-2 | 430 | 14 | 0.77 | 952.6 | 48.9 |
| 61 | 630-2 | 430 | 14 | 0.74 | 915.1 | 48.5 |
| 66 | 630-2 | 430 | 14 | 0.78 | 859.8 | 37.8 |
| 68 | | | | | | |
| 71 | 630-2 | 430 | 14 | 0.76 | 938.3 | 56.2 |
| 53 | 630-2 | 410 | 8 | 0.75 | 1012.2 | 31.8 |
| 57 | 630-2 | 410 | 8 | 0.78 | 1024.7 | 28.4 |
| 59 | | | | | | |
| — | 630-2 | 410 | 8 | 0.79 | 1046.9 | 29.7 |
| 61 | 630-2 | 410 | 8 | 0.75 | 990.1 | 30.3 |
| 66 | | | | | | |
| 68 | 630-2 | 410 | 8 | 0.79 | 1053.4 | 30.4 |
| 71 | 630-2 | 410 | 8 | | | |

Examples 1-113

The exemplary crystallizable glasses (most of which are formable, crystallizable glass compositions) listed in Tables I, II, III, and V were prepared by introducing appropriately batched raw materials to a platinum crucible. The crucible was then placed in a furnace having a temperature anywhere from about room temperature to about 1550° C. The materials were them refined at temperatures up to about 1650° C. or more. The molten glasses were then either poured onto a steel plate to make patties of glass, or they were formed into sheet by rolling or down draw.

The viscosities as a function of temperature for several of formable, crystallizable glass samples was determined which demonstrates that the formable, crystallizable glasses compatible commercial melting and/or forming technologies. Patties or portions of patties of formable, crystallizable glass compositions were then heat treated in a static furnace according to various crystallizing cycle listed in Tables I, II, III, and IV.

Among the analysis was the CIELAB color space coordinates (e.g., CIE L*; CIE a*; and CIE b*; or CIE L*, a*, and b*; or L*, a*, and b*) determination and phase identification by x-ray diffraction summarized in Tables I, II, III, and IV.

Among the further processing was an ion exchange treatment. A glass-ceramic material is cut into shapes suitable for ion exchange evaluation. For the purposes of this ion exchange treatment, glass-ceramic materials were cut into appropriately sized samples. Each sample is ground to appropriate dimensions and then given an optical polish on all surfaces. The samples are then cleaned to eliminate any residual organic contamination. Each cleaned sample is suspended in a bath of molten $KNO_3$ and held at between 370° C. and 450° C. so as to minimize points of contact between the glass-ceramic and the holder or bath vessel. After an appropriate number of hours in the bath (e.g., up to about 8 hr or more), the sample is removed, allowed to cool, and washed in deionized water to remove any residual salt. Following an ion exchange treatment (i.e., KNO₃ at between about 370° C. and 450° C.), several samples were analyzed to determine characterizing parameters compressive stresses ($\sigma_s$) in a surface layer, CSavg, and DOL as shown in Table V.

Accordingly, various modifications, adaptations, and alternatives may occur to one skilled in the art without departing from the spirit and scope of this disclosure. It should be understood that all such modifications and improvements have been deleted herein for the sake of conciseness and readability but are properly within the scope of the following claims.

We claim:

1. A glass-ceramic comprising:
  a. less than about 15 wt % of one or more crystalline oxide phases; and
  b. a composition comprising on an oxide basis in mol %:
    a. about 50-76 $SiO_2$;
    b. about 4-25 $Al_2O_3$;
    c. greater than 0 to about 14 $P_2O_5+B_2O_3$;
    d. greater than 0 to about 33 $R_2O$, wherein $R_2O$ comprises one or more of $Li_2O$, $Na_2O$, $K_2O$, $Rb_2O$, $Cs_2O$, $Cu_2O$, and $Ag_2O$; and
    e. greater than 0 to about 5 of one or more nucleating agents; and
    f. optionally, from 0 to about 20 RO, wherein RO comprises one or more of MgO, CaO, SrO, BaO, and ZnO.

2. A glass-ceramic according to claim 1, the composition further comprises on an oxide basis in mol % about 0-20 RO, and optionally:
  a. about −4 to about 10 $R_2O+RO-Al_2O_3$; or
  b. about −8 to about 8 $R_2O-Al_2O_3$; or
  c. about −4 to about 10 $R_2O+RO-Al_2O_3$ and about −8 to about 8 $R_2O-Al_2O_3$.

3. A glass-ceramic according to claim 1, wherein the glass-ceramic has a transmission of less than about 40% at least one wavelength, $\lambda_T$, in an interval of wavelengths from about 390 nm-2500 nm through an about 0.8 mm thickness.

4. A glass-ceramic according to claim 1, wherein the glass-ceramic has an average value of Transmission over a λ interval from about 390 nm-2500 nm $$\left[{}_{390\,nm}^{2500\,nm}T_{avg}(\%) = \frac{1}{(2500-390\,nm)}\sum_{390\,nm}^{2500\,nm}T_\lambda\{\%\}\right]$$

through an about 0.8 mm thickness of less than about 45%.

5. A glass-ceramic according to claim 1, wherein the glass-ceramic has a transmission of less than about 90% at least one wavelength, $\lambda_T$, in an interval of wavelengths from about 390 nm-2500 nm through a glass portion of an about 0.8 mm thickness.

6. A glass-ceramic according to claim 1, wherein the glass-ceramic has an average value of Transmission over a λ interval from about 390 nm-2500 nm $$\left[{}_{390\,nm}^{2500\,nm}T_{avg}(\%) = \frac{1}{(2500-390\,nm)}\sum_{390\,nm}^{2500\,nm}T_\lambda\{\%\}\right]$$

through a glass portion of an about 0.8 mm thickness of less than about 90%.

7. A glass-ceramic according to claim 1, wherein the one or more crystalline oxide phases comprise crystallites having a size less that about 300 nm.

8. A glass-ceramic according to claim 1, wherein the glass-ceramic is ion exchangeable and comprises:
  a. at least one surface under a compressive stress ($\sigma s$) of at least about 200 MPa in a compressively stressed layer having a depth of layer (DOL) of at least about 20 μm; or
  b. at least one compressively stressed layer having a DOL of 20 μm up to about 150 μm for a part thickness of from about 0.7 millimeter (mm) up to 5 mm comprising.

9. A glass-ceramic according to claim 1, further comprising a color presented in CIELAB color space coordinates for CIE illuminant D65 determined from reflectance spectra measurements using a spectrophotometer with SCE of the following ranges:
  i. a*=from about −2 to about +8;
  ii. b*=from about −7 to about +30; and
  iii. 1. L*=from about 85 to about 100, or
    2. L*=from about 0 from about to about 70.

10. A glass-ceramic according to claim 8, wherein the glass-ceramic is ion exchanged (IX), and wherein a Vickers median crack initiation threshold comprises at least 5 kilograms force (kgf).

11. A glass-ceramic according to claim 1, wherein one or more nucleating agents comprises on an oxide basis in mol %:
  a. up to about 5 $TiO_2$; or
  b. alternatively, up to about 3 $ZrO_2$; or
  c. $TiO_2$ and $ZrO_2$, wherein $TiO_2+ZrO_2$ comprises up to about 5 and $ZrO_2$ comprises up to about 3.

* * * * *